United States Patent [19]
Kato et al.

[11] Patent Number: 5,587,785
[45] Date of Patent: Dec. 24, 1996

[54] LASER DOPPLER VELOCIMETER

[75] Inventors: Satoru Kato; Hiroshi Ito; Tadashi Ichikawa; Manabu Kagami, all of Aichi-ken, Japan

[73] Assignee: Kabushiki Kaisha Toyota Chuo Kenkyusho, Aichi-ken, Japan

[21] Appl. No.: 407,671

[22] Filed: Mar. 21, 1995

[30]     Foreign Application Priority Data

Mar. 22, 1994  [JP]  Japan .................... 6-050690
Feb. 28, 1995  [JP]  Japan .................... 7-040933

[51] Int. Cl.⁶ ............................................. G01D 3/36
[52] U.S. Cl. ................................. 356/28.5; 356/28
[58] Field of Search ........................... 356/28.5, 28

[56]         References Cited

U.S. PATENT DOCUMENTS 5,327,222  7/1994  Takamiya et al. ................ 356/356

FOREIGN PATENT DOCUMENTS

| | | | |
|---|---|---|---|
| 3937851 | 5/1990 | Germany | 356/28.5 |
| 57-59173 | 4/1982 | Japan . | |
| 63-200085 | 8/1988 | Japan . | |
| 2-107988 | 4/1990 | Japan . | |
| 2-201165 | 8/1990 | Japan . | |

OTHER PUBLICATIONS

O. Sasaki et al, Applied Optics, vol. 19, No. 8, Apr. 1980, p. 1306.
The Japan Society of Applied Physics and Related Societies, 28a–c–7, "Two–dimensional LDV using a LD frequency change and self–mixing effect", Shizuoka University Taku Aoshima and Junji Ohtsubo.

*Primary Examiner*—Stephen C. Buczinski
*Attorney, Agent, or Firm*—Oblon, Spivak, McClelland, Maier & Neustadt, P.C.

[57]             ABSTRACT

A laser Doppler velocimeter in which laser light whose frequency changes continuously at least for a fixed time duration is branched into at least two beams, and the at least two branched beams are respectively transmitted by at least one pair of optical fibers having an optical path difference therebetween, and are focused onto a region to be measured by at least one focusing device. The scattered light of the laser beams focused in the region to be measured are received by a light-receiving device via at least one incident device. At least one Doppler shift frequency in the region to be measured is calculated on the basis of the frequency of a signal of the scattered light received by the light-receiving device, the optical path difference, and a rate of change of the frequency of the laser light. The flow velocity and the direction of the flow velocity are calculated from the calculated Doppler shift frequency.

10 Claims, 18 Drawing Sheets

LASER DOPPLER VELOCIMETER

BACKGROUND OF THE INVENTION

1. Field of the Invention

The present invention relates to a laser Doppler velocimeter, and more particularly to a laser Doppler velocimeter in which laser light is emitted to at least one point in a region to be measured, and both the flow velocity and the direction of the flow velocity in the region to be measured are measured from a Doppler shift frequency of a signal of the received light. This laser Doppler velocimeter can also be used for a laser Doppler microscope and a laser Doppler radar.

2. Description of the Related Art

A conventional laser Doppler velocimeter (Japanese Patent Application Laid-Open No. 57-59173) which served as a basis of the present invention is shown in FIG. 1. In FIG. 1, reference numeral 1 denotes a laser light source; 14, an optical fiber; 2, a beam splitter; 10, a measuring probe in which a micro lens and an optical fiber are integrated; 11, an optical fiber probe with or without a micro lens; 12, a probe-fixing jig. In addition, reference numeral 13 denotes a micro lens; 6, a light-receiving element such as an avalanche photodiode (APD), a photomultiplier or a pin photodiode (PINPD); 7, a light receiver; 8, a fluid to be measured; and 9, a light-scattering particle.

This laser Doppler velocimeter is based on a differential Doppler heterodyne method in which laser light emitted from the laser light source 1 is split into two projected beams of light by the beam splitter 2, the two projected beams of light are transmitted through the measuring probe and are focused onto a point by means of the micro lenses of the measuring probe, and the flow velocity is detected from a heterodyne detection frequency obtained by performing heterodyne detection by the light receiver 7. In this laser Doppler velocimeter, although the flow velocity can be detected since a Doppler shift appears in proportion to the flow velocity, it is impossible to detect the direction of the flow velocity.

Namely, the frequencies of the two laser beams in a focused portion are identical, and a Doppler shift frequency $f_D$ can be expressed by Formula (2) below. In such a differential-type configuration, however, the direction of the flow velocity cannot be detected since the Doppler shift frequency $f_D$, which is due to a light-scattering particle moving in the focused portion from top to down in the plane of FIG. 1 and a light-scattering particle moving from down to top, assume identical values.

On the other hand, if the frequency of one of the two split laser beams is set at a value different from that of the frequency of the other laser beam, it is possible to detect a difference frequency of this frequency due to heterodyne detection, so that the signal of the received light from the light receiver 7 is proportional to the flow velocity, as expressed by Formula (1), with this difference frequency set as an offset frequency. Namely, if the offset frequency is known, it is possible to detect the direction of the flow velocity and a flow velocity value.

Accordingly, to detect the direction of the flow velocity, an arrangement is conventionally provided such that a light beam for projection is passed through an acousto-optic element so as to shift the frequency (Japanese Patent Application Laid-Open No. 57-59173, lines 15–17 in the left-hand column of page 3).

In this technique, the frequency $f_{SA}$ of the signal of the received light from the scattering particle is given by the following formula.

$$f_{SA} = f_{AD} + f_D \quad (1)$$

$$f_D = (2v/\lambda)\sin(\phi/2) \quad (2)$$

where $f_{AD}$ is an amount of frequency shift by the acousto-optic element, $f_D$ is a Doppler shift frequency due to the scattering particle, v is a flow velocity (vector quantity) of the scattering particle, $\lambda$ is the wavelength of the light source, and $\phi$ is an intersecting angle between the two light beams for projection. In other words, since the frequency of the signal of the received light is detected by using the amount of frequency shift $f_{AD}$ as the offset frequency, if the offset frequency is determined in advance, it is possible to detect only the Doppler shift frequency $f_D$. Thus, it is possible to determine the flow velocity and the direction of the flow velocity from the detected Doppler shift frequency $f_D$.

However, since the acousto-optic element is driven stably only at a fixed frequency, the quantity of the frequency shift, $f_{AD}$, which is the offset frequency, cannot be set arbitrarily. Hence, the present situation is such that, with respect to a low-velocity object to be measured, high-accuracy measurement is not possible due to a restriction of a Doppler shift frequency analyzer (e.g., a restriction that, when, for example, $f_{AD} = 80$ MHz, $f_D = 100$ Hz).

To overcome this point, a system has been proposed in "Two-dimensional vector LDV making use of frequency-shift characteristic and self-mixing effect of LD," Extended Abstracts (The 37th Spring Meeting, 1990); The Japan Society of Applied Physics and Related Societies, 28a-c-7. This system makes use of the characteristics of a laser diode in which the oscillation frequency of a semiconductor laser shifts with changes in the temperature and an injected electric current, and if part of the laser light emitted by the semiconductor laser returns to its own oscillation area, there occur such behaviors as the longitudinal-mode hopping, the oscillation of a multiplicity of longitudinal modes, the generation of noise, and the like.

In this system, a two-dimensional vector LDV (laser Doppler velocimeter), such as the one shown in FIG. 2, is configured by confining a frequency modulated LDV, which imparts an offset frequency to a beat signal by making use of the characteristic of a frequency shift with respect to the injected current, and a self-mixing-type LDV making use of interference between return light and oscillation. Incidentally, M1, M2, and M3 denote mirrors, and HM denotes a half mirror. The measurement of a two-dimensional velocity vector becomes possible since the directions of velocity components which are detected by the frequency modulated LDV and the self-mixing-type LDV differ from each other. In addition, the directions of the velocity components can be discriminated by the orientation of the shift of the signal frequency with respect to the offset frequency of the frequency modulated LDV and the orientation of the sawtooth waves observed as signal waves in the case of the self-mixing-type LDV.

Namely, in this system, a semiconductor laser is used as the light source, the oscillation frequency is linearly changed by sawtooth waves by means of an injected current, light is emitted to an object to be measured by means of a differential-type optical system with a difference in the optical path length imparted to the two light beams for projection, part of the light scattered from a passing particle is returned to the semiconductor laser, and a self-mixing effect (Japanese Patent Application Laid-Open No. 2-201165) is made use of, so as to measure the flow velocity and the direction of the flow velocity. At this time, the frequency component $f_{SM}$ of the detected signal is as follows:

$$f_{SM} = f_{OF} + f_D \pm (f_{OF} + f_D) \cdot (D/c) \quad (3)$$

$$f_{OF} = (dv/dt) \cdot (D/c) \quad (4)$$

where dv/dt is a rate of change over time of the oscillation frequency of the semiconductor laser which is the light source, D is a difference between the optical path lengths of illuminating light 1 and 2, and c is the velocity of light in a vacuum.

Since this system is provided with the optical path difference in the atmosphere, the system itself becomes large in size, with the result that the range of the portion to be measured is limited. In addition, since the signal frequency corresponding to the offset frequency fluctuate due to fluctuations in the atmosphere and the vibration of the system, and scattered light from the two projecting optical paths having an optical path difference returns to the light source simultaneously, an output signal due to the self-mixing effect includes frequency components other than those which are due to the Doppler shift and are proportional to the optical path difference between the two optical paths. Consequently, frequency components other than $f_{OF}$ and $f_D$ appear in the detected signal $f_{SM}$, and it is impossible to detect $f_D$ alone on a stable basis, so that it is impossible to conduct signal analysis on a stable basis. Furthermore, since restrictions are imposed on the optical path difference in terms of the structure of the system, there is a problem, among others, in that the range in which accurate measurement is possible is narrow.

In addition, as a velocimeter for simultaneously measuring information on flowrates at a plurality of measurement points, an apparatus is known in which predetermined laser wavelengths are allotted to respective measuring probes, and which employ laser light sources and photodetectors which are each provided in a number identical to that of the measuring probes. However, there is a problem in that the configuration becomes complicated since a plurality of measuring probes and photodetectors are required.

Further, in a laser Doppler velocimeter disclosed in Japanese Patent Application Laid-Open No. 2-107988, by using one laser light source, a laser beam is split into two polarized components perpendicular to each other, the two polarized components are applied to different objects to be measured, the measuring light from the plurality of objects is synthesized with a reference beam, and a plurality of synthesized light components are obtained in correspondence with their polarized states, thereby simultaneously measuring a multiplicity of points by a single optical modulator and a plurality of photodetectors. With this laser Doppler velocimeter, although a single light source is used, a plurality of photodetectors are required for detecting Doppler signals obtained by respective polarized light components, and since the two polarized components which are perpendicular to each other so as not to interfere with each other are separated, only two measurement points can be theoretically measured simultaneously.

SUMMARY OF THE INVENTION

The present invention has been devised to overcome the above-described problems, and its object is to provide a laser Doppler velocimeter which is capable of measuring with high accuracy an object whose flow velocity is to be measured extensively, and which, in a case where a plurality of measurement points are measured, is capable of measuring velocity information simultaneously without being theoretically restricted by the number of the measurement points with a relatively simple configuration.

To attain the above object, in accordance with a first aspect of the present invention, there is provided a laser Doppler velocimeter comprising: a light source for emitting laser light whose frequency changes continuously for at least a fixed time duration; a branching device for branching the laser light emitted from the light source into at least two beams; at least one pair of optical fibers for transmitting each of the laser beams branched by the branching device, the optical fibers having an optical path difference therebetween; at least one focusing device for focusing the laser beams transmitted by the optical fibers onto a region to be measured; at least one incident device upon which is projected scattered light from the region to be measured where the laser beams are focused; a light-receiving device for receiving the scattered light from the incident device; and a calculating device for calculating at least one Doppler shift frequency in the region to be measured on the basis of a frequency of a signal of the scattered light received by the light-receiving device, the optical path difference, and a rate of change of the frequency of the laser light.

In addition, in accordance with a second aspect of the present invention, there is provided a laser Doppler velocimeter comprising: a light source for emitting laser light whose frequency changes continuously for at least a fixed time duration; at least one branching device for branching the laser light emitted from the light source into at least two beams; at least one reference optical fiber for transmitting one of the laser beams branched by the branching device as a reference beam; at least one measurement optical fiber for transmitting another of the laser beams branched by the branching device as a measuring beam, the at least one measurement optical fiber having an optical path difference with respect to the at least one reference optical fiber; at least one focusing device for focusing the laser beam transmitted by the measurement optical fiber onto a region to be measured; at least one incident device upon which is projected scattered light from the region to be measured where the laser beams are focused; a light-receiving device for receiving the scattered light from the incident device and the reference beam transmitted by the reference optical fiber; and a calculating device for calculating at least one Doppler shift frequency in the region to be measured on the basis of a frequency of a signal of the scattered light received by the light-receiving device, the optical path difference, and a rate of change of the frequency of the laser light.

In accordance with the first aspect of the present invention, laser light whose frequency changes continuously for at least a fixed time duration is emitted from the light source, and this laser light is branched into at least two beams by the branching device. As the light source, it is possible to use a laser such as a semiconductor laser which is capable of continuously modulating the frequency by oscillating in a single longitudinal mode. At least one optical fiber pair constituted by a pair of optical fibers having an optical path difference is provided, and the branched laser beams are respectively transmitted by the optical fibers, and are focused onto a region to be measured by at least one focusing device. Then, forwardly or backwardly scattered light from light-scattering particles in a fluid or gas which pass through the region to be measured is made incident upon the incident device, and is received by the light-receiving device. At least one Doppler shift frequency in the region to be measured is calculated by the calculating device on the basis of the frequency of a signal of the light received by the light-receiving device, the optical path difference of the optical fibers, and a rate of change of the frequency of the laser light.

Namely, if a case is considered in which the laser light is branched into two beams and one optical fiber pair is used, and if it is assumed that a rate of change of a frequency v with respect to time t is dv/dt, the optical path difference is L, and the velocity of the laser light in a vacuum is c, the frequency difference between the two laser beams, i.e., an offset frequency $f_{OF}$, is given by the following formula:

$$f_{OF}=(dv/dt)\cdot(L/c) \quad (5)$$

In addition, if the Doppler shift frequency is assumed to be $f_D$, the frequency $f_S$ of the signal of the received light is given by the following formula:

$$f_S=f_{OF}+f_D \quad (6)$$

Thus, since the Doppler shift appears with $f_{OF}$ set as the offset frequency, if the offset frequency $f_{OF}$ is measured in advance, it is possible to measure only the Doppler shift frequency $f_D$ with high accuracy, and it is possible to calculate the velocity of the scattering particle, i.e., the flow velocity and the direction of the flow velocity, from the measured Doppler shift frequency $f_D$.

Incidentally, if the laser light is branched into 2N (N is a natural number) beams by the branching device, and the branched laser beams are transmitted by N optical fiber pairs having mutually different optical path differences, and are focused onto N measurement points in a region to be measured by N focusing devices, and then, if the scattered light is made incident upon N incident devices and is received by a single light-receiving device by synthesizing it or separately, it is possible to obtain N Doppler shift frequencies. Thus, it is possible to simultaneously detect flow velocities and directions of the flow velocities at the N measurement points.

In accordance with the second aspect of the present invention, its basic principle is identical to that of the first aspect of the present invention, and at least one of the laser beams branched into at least two beams is focused onto a region to be measured as a measuring beam, and at least one other beam is used as a reference beam. The light-receiving device receives the scattered light due to the laser beam focused onto the region to be measured and the reference beam. Then, as described in connection with the first aspect of the present invention, the flow velocity and the direction of the flow velocity can be detected simultaneously.

In addition, if the laser light is branched into 2N beams by the branching device, a reference beam(s) are respectively transmitted by M (1≦M≦N) reference optical fibers, and the laser beams are respectively transmitted by N measurement optical fibers having mutually different optical path differences, and are focused onto N measurement points in a region to be measured by N focusing devices, and then, if the scattered light is made incident upon N incident devices and is received by the single light-receiving device by synthesizing it or separately, it is possible to simultaneously detect flow velocities and directions of the flow velocities at the N measurement points.

In accordance with the first and second aspects of the present invention, if the rate of change of the frequency of the light source and the optical path difference of the optical fibers are set to appropriate values, the offset frequency can be set arbitrarily, so that it is possible to conduct measurement with high accuracy over a wide set range, i.e., from a low velocity to a high velocity, without being restricted by an object to be measured. In addition, since optical fibers are used, an optical-fiber directional coupler can be used to branch the laser light into two beams, and if the optical-fiber directional couplers are used, it is possible to make the system compact and stable.

If a plurality of measurement points are measured, it is possible to simultaneously measure velocity information without being theoretically restricted by the number of measurement points in a relatively simple configuration.

Furthermore, if the optical fibers are disposed in close proximity to each other, the temperature condition becomes identical for the optical fibers, so that the effect due to temperature fluctuations can be canceled, and it is possible to obtain a stable offset frequency. Additionally, if an exclusive-use optical fiber is used for receiving the scattered light, the configuration allow the scattered light to be received efficiently, thereby making possible frequency analysis on a stable basis.

If the optical path difference of the optical fibers is set to be shorter than the coherence length of the laser light, the visibility of interference fringes formed in the focused portion in the region to be measured becomes high, and it is possible to obtain a signal of the received light with a high signal-to-noise ratio. If the optical path length is set to be longer than the coherence length, it does not mean that no signal is obtained, but that the signal-to-noise ratio of the signal of the received light only declines.

As described above, in accordance with the first and second aspects of the present invention, since the frequency of the light source is modulated and an optical path difference is imparted to the optical fibers, it is possible to set the offset frequency to an arbitrary value. Hence, it is possible to obtain an advantage in that an object whose flow velocity is to be measured extensively can be measured with high accuracy.

The above and other objects, features and advantages of the present invention will become more apparent from the following detailed description of the invention when read in conjunction with the accompanying drawings.

DESCRIPTION OF THE PREFERRED EMBODIMENTS

Figure 1:
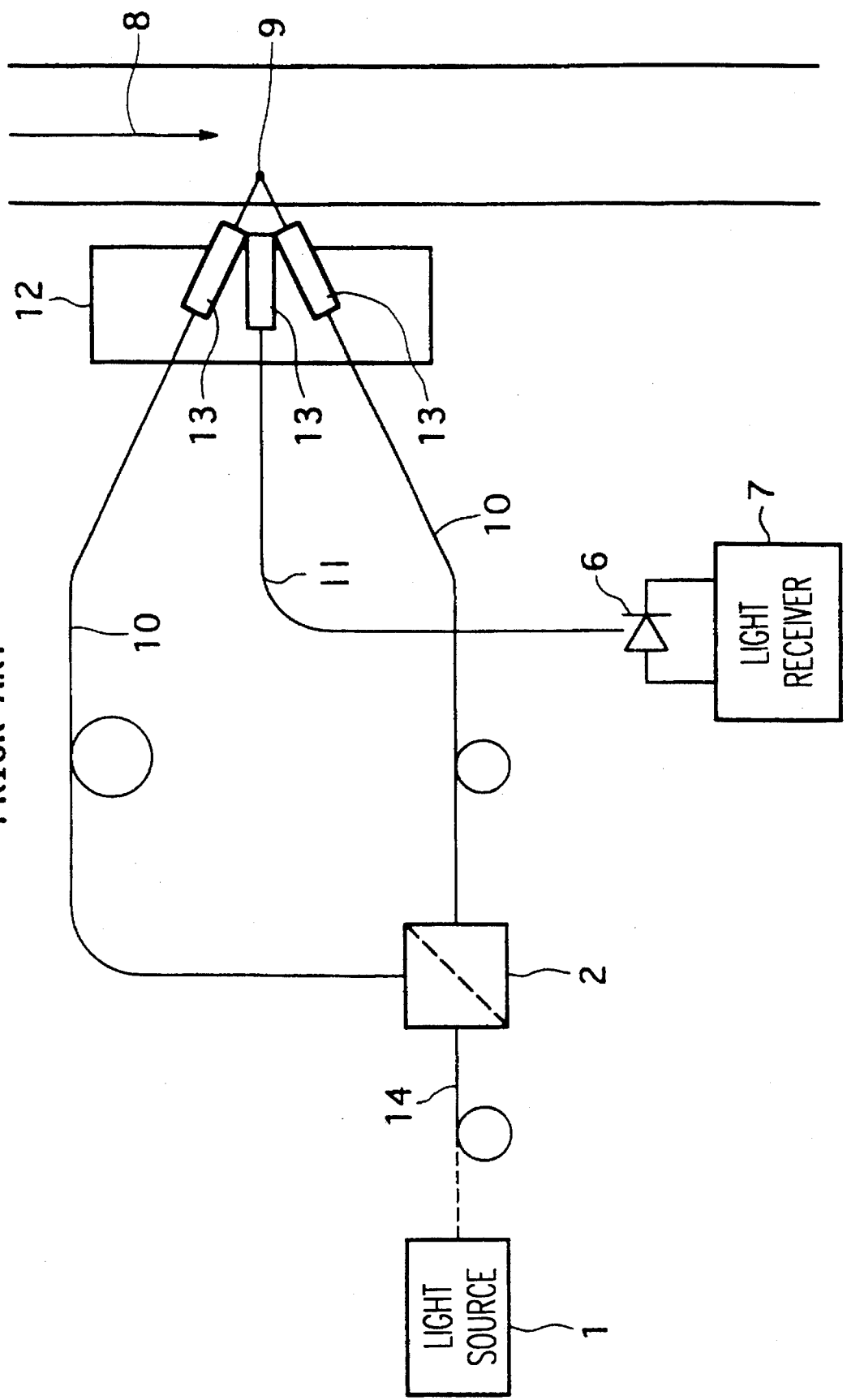
FIG. 1 is a schematic diagram of a conventional differential-type laser Doppler velocimeter.
Figure 2:
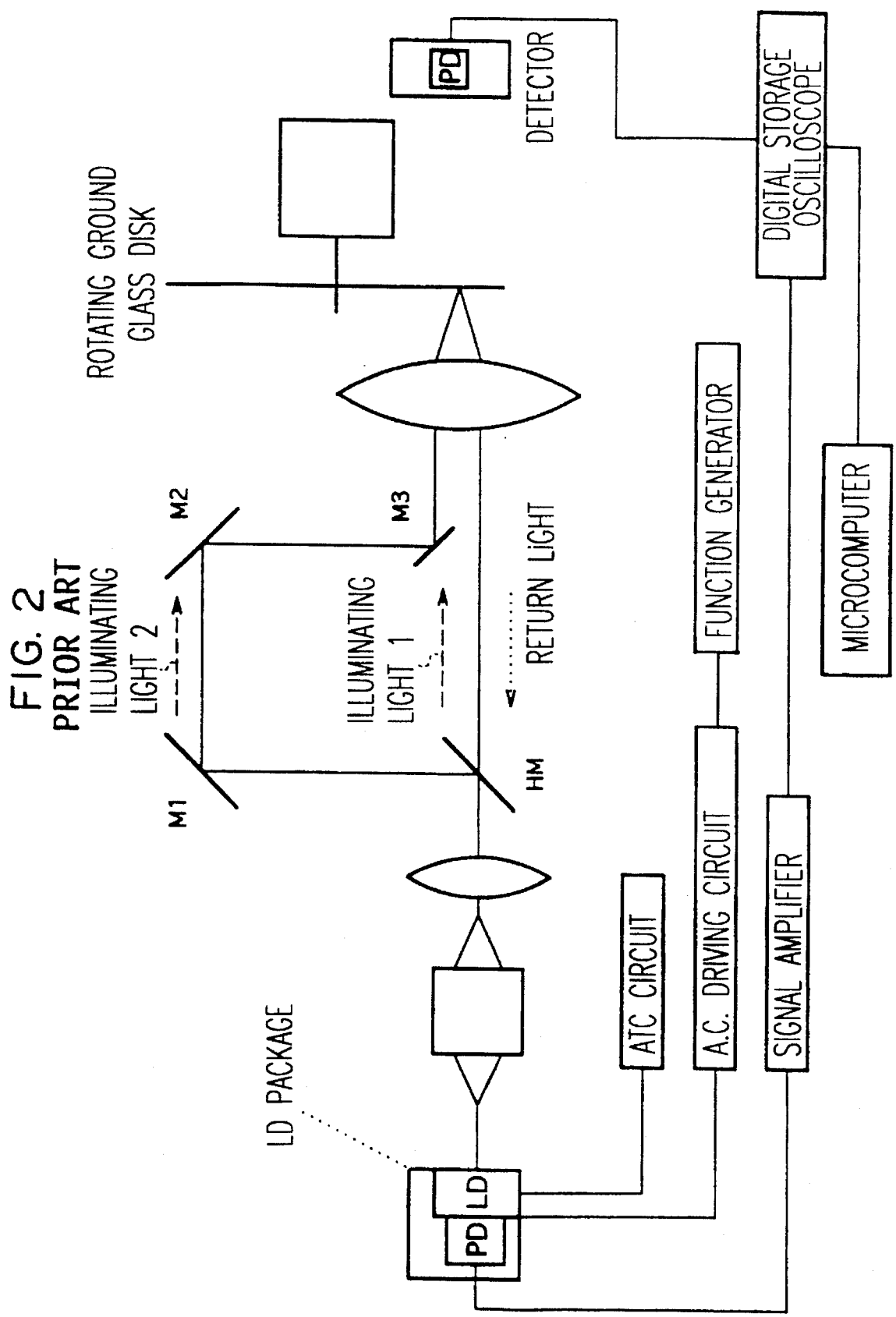
FIG. 2 is a schematic diagram of a conventional two-dimensional-vector laser Doppler velocimeter.
Figure 3:
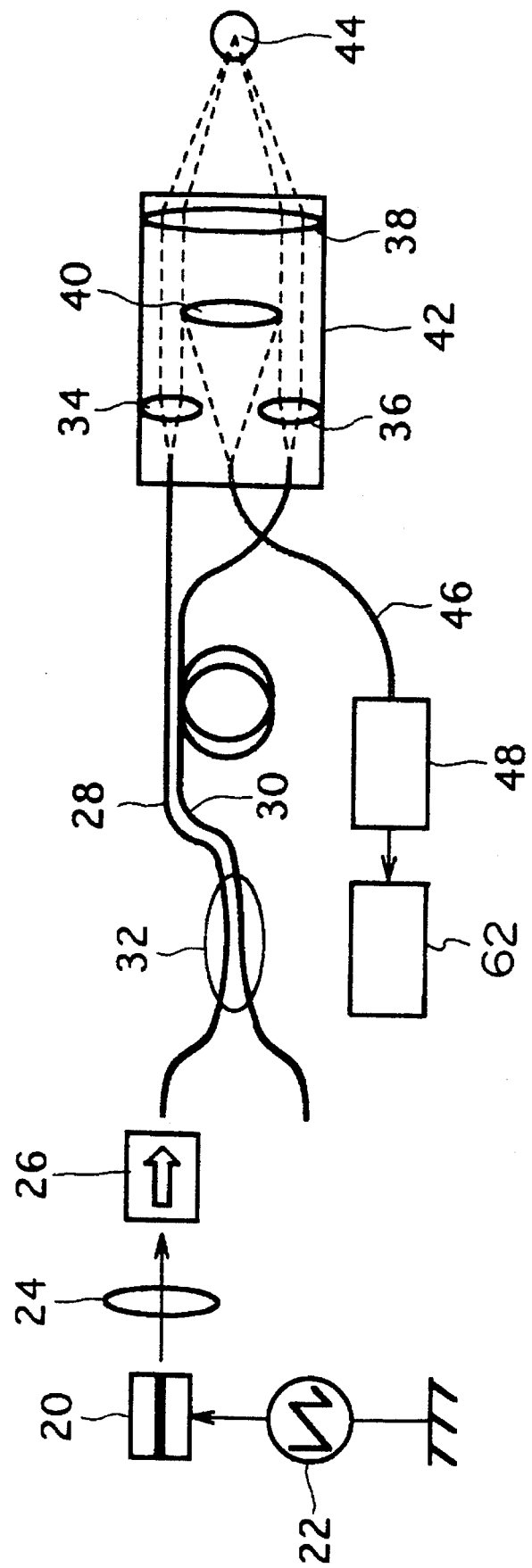
FIG. 3 is a schematic diagram of a differential-type laser Doppler velocimeter in accordance with a first embodiment of the present invention.

Referring now to the accompanying drawings, a description will be given of the embodiments of the present invention. FIG. 3 is a schematic diagram of a differential-type optical-fiber laser Doppler velocimeter in accordance with a first embodiment. The differential-type optical-fiber laser Doppler velocimeter is capable of measuring a velocity component which is perpendicular to the optical axis. Connected to a semiconductor laser 20, i.e., a light source, is a driving circuit 22 for modulating the electric current injected into the semiconductor laser into sawtooth waveform. A collimator lens 24 for converting laser light into a bundle of parallel rays is disposed on the laser-light emitting side of the semiconductor laser 20. An optical isolator 26, which allows the semiconductor laser 20 to oscillate stably in a single longitudinal mode without causing the return light to be made incident upon the semiconductor laser 20, is disposed on the laser-light emitting side of the collimator lens 24. The optical isolator 26 is optically coupled to a measuring probe 42 by means of an optical fiber bundle constituted by a pair of optical fibers.

The optical fiber bundle serving as an optically coupling means for optically coupling the optical isolator 26 and the measuring probe 42 has a first projecting optical fiber 28, a second projecting optical fiber 30, and an optical branching device for branching the inputted laser light into two beams. One end of the first projecting optical fiber 28 is optically coupled to the optical isolator 26, and a portion of the first projecting optical fiber 28 in the vicinity of its end, which is optically coupled to the optical isolator 26, is optically coupled to a portion of a vicinity of the second projecting optical fiber 30 having one end free, by means of a one-input, two-output optical-fiber directional coupler 32 serving as the optical branching device for branching the inputted laser light into two beams.

The optical path length of the second projecting optical fiber 30 is made a predetermined length L longer than that of the first projecting optical fiber 28, so that an optical path difference is provided between the optical fibers. The first projecting optical fiber 28 and the second projecting optical fiber 30 are provided with cores having the same refractive index of n, and the length of the second projecting optical fiber 30 is made ΔL longer than that of the first projecting optical fiber 28, so that the optical path difference L can be provided as being L=n·ΔL. Incidentally, if the refractive indexes of the first projecting optical fiber 28 and the second projecting optical fiber 30 are made different, it is also possible to obtain the optical path difference L.

Further, the first projecting optical fiber 28 and the second projecting optical fiber 30 are disposed as close to each other as possible so that the effects due to fluctuations in the temperature and the like become identical.

Although, in the above-described embodiment, the optical-fiber directional coupler 32 has been shown as the optical branching device, the optical-fiber directional coupler may be replaced by a half mirror, a polarizing beam splitter, or the like.

Figure 4:
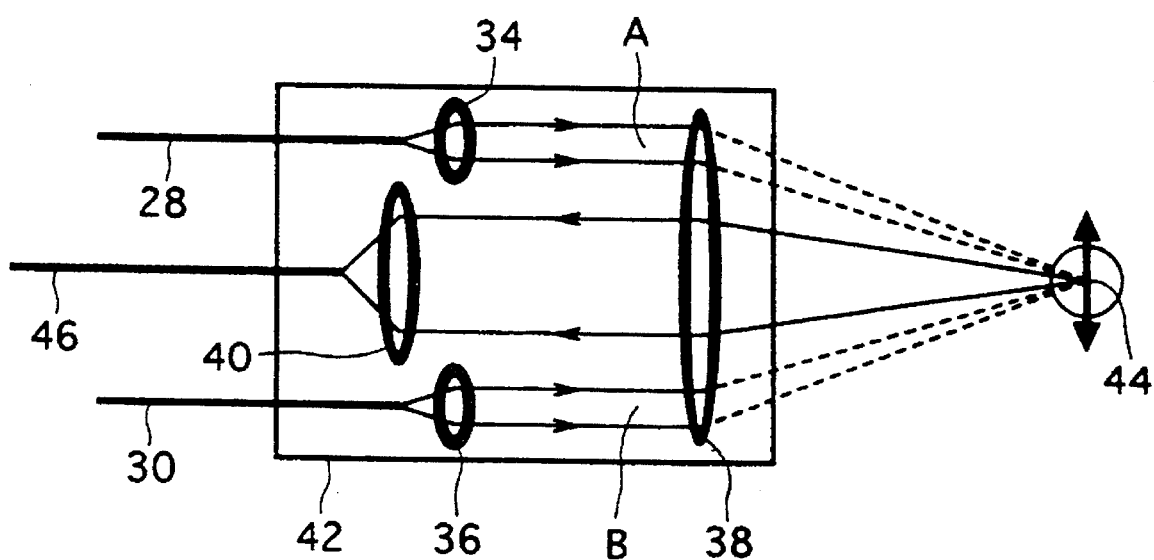
FIG. 4 is a schematic diagram illustrating a measuring probe portion of the laser Doppler velocimeter in accordance with the embodiment of the present invention.

As also shown in FIG. 4, the other ends of the first projecting optical fiber 28 and the second projecting optical fiber 30 are inserted in the measuring probe 42, and collimator lenses 34, 36, a focusing lens 38, and a light-receiving lens 40 are accommodated therein.

Emitting end faces of the first projecting optical fiber 28 and the second projecting optical fiber 30 are disposed at the positions of focal points of the collimator lenses 34, 36, respectively. As a result, two bundles of parallel rays (projected light beams A and B) are obtained. The focusing lens 38 is disposed on the projected-beam emitting sides of the collimator lenses 34, 36. The focusing lens 38 allows the two light beams to focus (cross) at a focusing position.

In addition, the other end of a light-receiving optical fiber 46 having one end connected to a photodetector 48 is inserted in the measuring probe 42 such that an end face of the light-receiving optical fiber 46 is positioned at a focusing position of the light-receiving lens 40. The photodetector 48 performs heterodyne detection with respect to scattered light by means of its photoelectric conversion surface and outputs a signal of the received light shown in Formula (6), while a calculating circuit 62 calculates a Doppler shift frequency from the signal of the received light so as to calculate the flow velocity and the direction of the flow velocity.

Figure 5A:
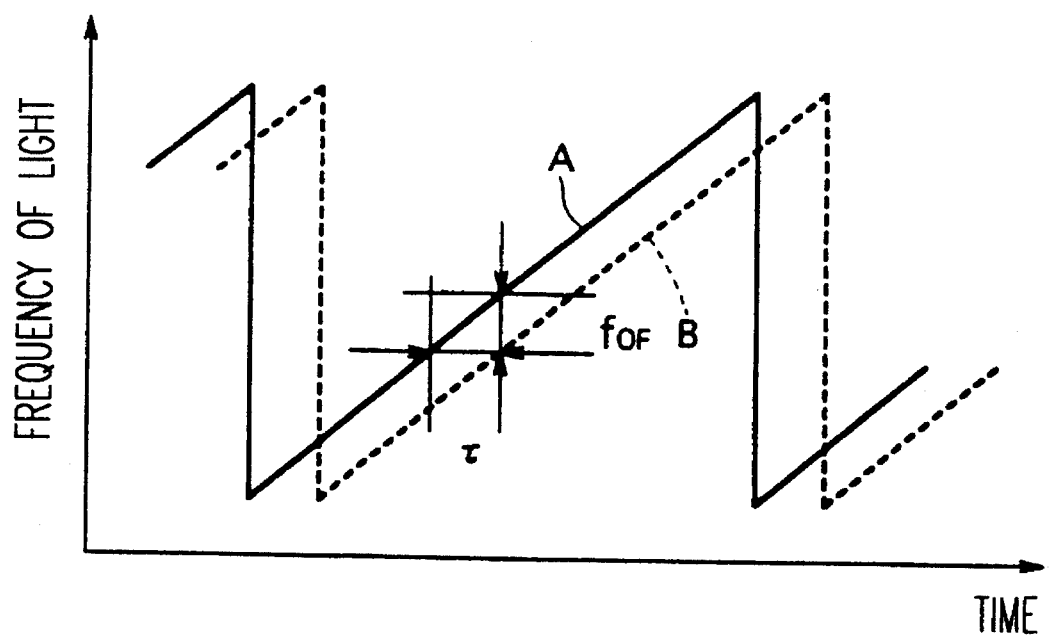
FIG. 5A is a diagram illustrating the relationship between the frequency and time in a case where modulated waves are formed as sawtooth waves.

Next, a description will be given of the operation of this embodiment. The driving circuit 22 modulates the electric current injected into the semiconductor laser 20 into sawtooth waveform. Consequently, the oscillation frequency of the semiconductor laser changes in proportion to the magnitude of the injected current, and linear changes in the frequency are obtained periodically, as shown in FIG. 5A. The rate of change of the frequency with respect to the injected current is up to 3 GHz/mA (a semiconductor laser having a wavelength band of 0.8 mµ), and at 10 mA or thereabouts it is possible to continuously change the frequency by oscillating in a single longitudinal mode without a mode jump.

The laser light emitted from the semiconductor laser 20 is converted into a bundle of parallel rays by the collimator lens 24, is passed through the optical isolator 26, and is branched into two beams by the optical-fiber directional coupler 32. Since the optical isolator 26 is provided, the return light to the semiconductor laser 20 is cut.

The laser light branched into two beams by the optical-fiber directional coupler 32 is transmitted to the measuring probe 42 by means of the first projecting optical fiber 28 and the second projecting optical fiber 30. The laser light transmitted to the interior of the measuring probe 42 is made emitted as the projected light beam A and the projected light beam B, which are parallel rays of light, by the collimator lenses 34 and 36. These projected light beams A and B are focused, i.e., crossed, at a focused portion 44 by means of the focusing lens 38.

When a scattering particle passes through the focused portion 44, the scattering particle scatters the projected light beams A and B in all directions. Part of the light scattered by the passing particle passes through the focusing lens 38 again, is formed into parallel rays of light, is focused at the focusing position by the light-receiving lens 40, and is transmitted to the photodetector 48 through the light-receiving optical fiber 46. The scattered light of the two projected light beams is subjected to heterodyne detection at the photoelectric conversion surface of the photodetector 48, and the Doppler shift frequency shown in Formula (6) is calculated by the calculating circuit 62.

FIG. 5A shows the relationship between the time and frequency of the projected light beams A and B in the focused portion 44 where the light is focused onto a point by the focusing lens 38 of the measuring probe 42. Since the second projecting optical fiber 30 is made longer than the first projecting optical fiber 28 by the optical path difference L as described above, the projected light beam B as compared with the projected light beam A is delayed by a time τ shown in the following formula due to the optical path difference L:

$$\tau = n \cdot \Delta L / c \quad (7)$$

Figure 5B:
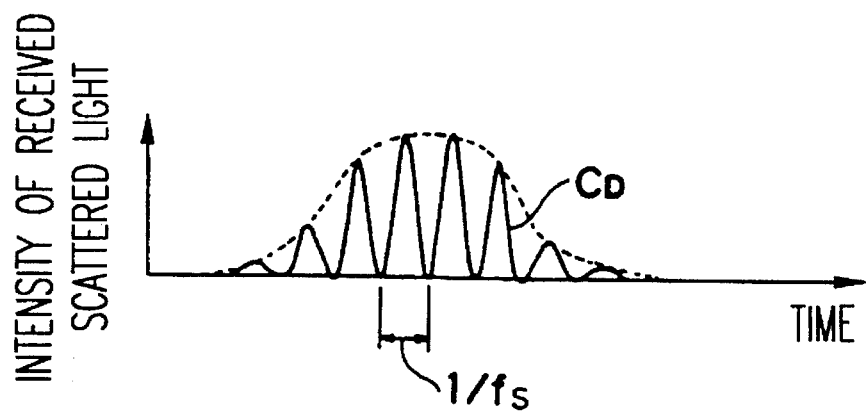
FIG. 5B is a diagram illustrating the waveform of a signal of received light.

Since the injected current is converted into sawtooth waveform, the rate of change of the frequency, dv/dt, is constant, and because of this time τ, the frequencies of the projected light beams A and B constantly differ from each other by an offset frequency $f_{OF}$ shown in Formula (5), as shown in FIG. 5A. In other words, a frequency component $f_S$ of scattered light from the scattering particle which has passed through the focused portion 44 is determined from Formula (6) above by adding this offset frequency and a shift portion due to the Doppler effect. In addition, a signal $C_D$ of the light received at this time, i.e., the intensity of the scattered light, is shown in FIG. 5B. Incidentally, $1/f_S$ shows one period of the signal of the received light, and the reciprocal of this period is the $f_S$ shown in Formula (6).

That is, since the Doppler shift appears with $f_{OF}$ as the offset frequency, if $f_{OF}$ is measured in advance in accordance with Formula (5) above, it is possible to measure with high accuracy only the Doppler shift frequency $f_D$ on the basis of the signal $C_D$ of the received light, thereby making it possible to detect the flow velocity and the direction of the flow velocity of the scattering particles.

In this embodiment, the oscillation frequency of the light source is varied, and an optical path difference is imparted to the projecting optical fibers, so as to produce a frequency difference in the projected light beams in the focused portion. The frequency difference is given by Formula (5), and is $f_{OF}$ shown in FIG. 5A. This $f_{OF}$ can be varied by the rate of change of the frequency, dv/dt, the optical path difference and, hence, the time τ, as shown in Formula (5).

In the semiconductor lasers of 0.8-µm-band single longitudinal mode oscillation which are presently commercially available, a coherence length is 10 and several meters or more, and if the offset frequency $f_{OF}$ based on Formula (5) is calculated on the basis of this value and the current modulation characteristic of the semiconductor laser, the offset frequency $f_{OF}$ becomes 30 MHz or more. Thus it is possible to obtain a value equivalent to that of the conventional techniques.

Although, in this embodiment, a configuration has been shown in which backwardly scattered light, which is scattered in an opposite direction to that of the light-emitting direction, is received, similar detection is possible if a configuration is provided such that forwardly scattered light, which is scattered in the light-emitting direction, is received.

Figure 6:
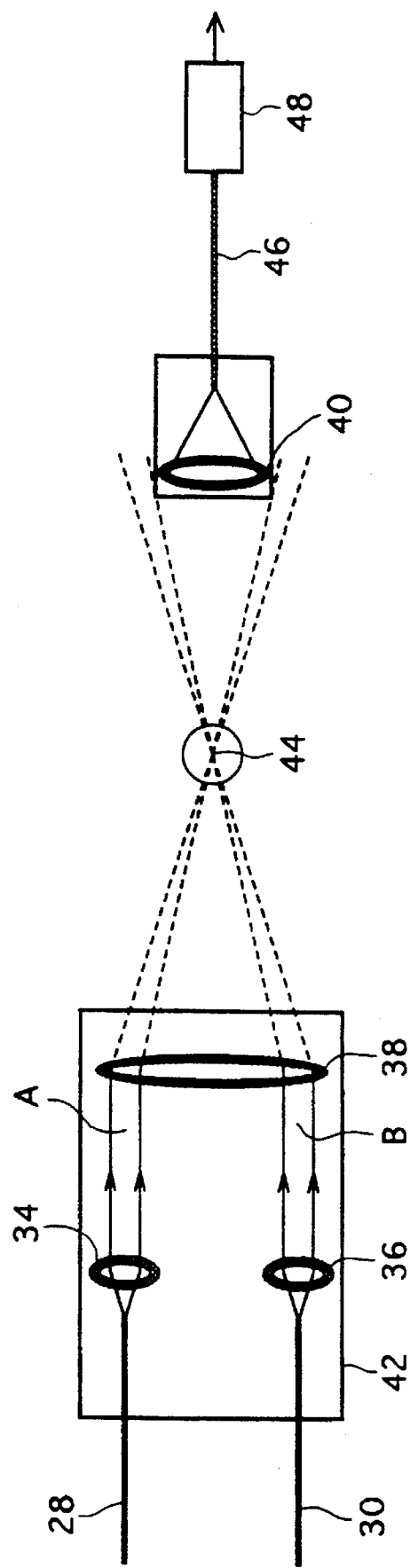
FIG. 6 is a schematic diagram of light in a forwardly scattered-light receiving-type laser Doppler velocimeter.

FIG. 6 illustrates a configuration of an optical system of a forwardly scattered-light receiving-type laser Doppler velocimeter. In FIG. 6, a description will be given by denoting portions corresponding to those of FIGS. 3 and 4 by the same reference numerals. In the measuring probe 42, the projecting optical system is configured in the same way as that shown in FIG. 4. In the receiving optical system, the light-receiving lens 40 is disposed forwardly of the focused portion 44 in the direction in which the projected light beams A, B are emitted, and the light-receiving optical fiber 46, which is optically coupled to the photodetector 48, is disposed such that its end face is located at the focusing position of the light-receiving lens 40. The scattered light transmitted to the photodetector 48 is subjected to heterodyne detection at its photoelectric conversion surface, so that a signal of the Doppler shift frequency $f_D$ expressed by Formula (6) is obtained.

Although, in FIG. 6, a configuration has been shown in which an image of the focused portion 44 is formed on the end face of the light-receiving optical fiber 46 by means of the light-receiving lens 40, the signal of the Doppler shift frequency $f_D$ expressed by Formula (6) is also obtained if the photoelectric conversion surface of the photodetector 48 is disposed at the position of the end face of the light-receiving optical fiber 40, i.e., at the focusing position of the light-receiving lens 40.

Next, a description will be given of a second embodiment of the present invention. Although, in the foregoing embodiment, the differential-type optical-fiber laser Doppler velocimeter has been shown, the flow velocity and the direction of the flow velocity can also be detected on the basis of the same basic principle as described above by using a reference-beam type laser Doppler velocimeter in which the light is projected and received by an identical optical fiber, and heterodyne detection is performed at the photoelectric conversion surface of a photodetector by using as a reference beam laser light which has not undergone a Doppler shift.

Figure 7:
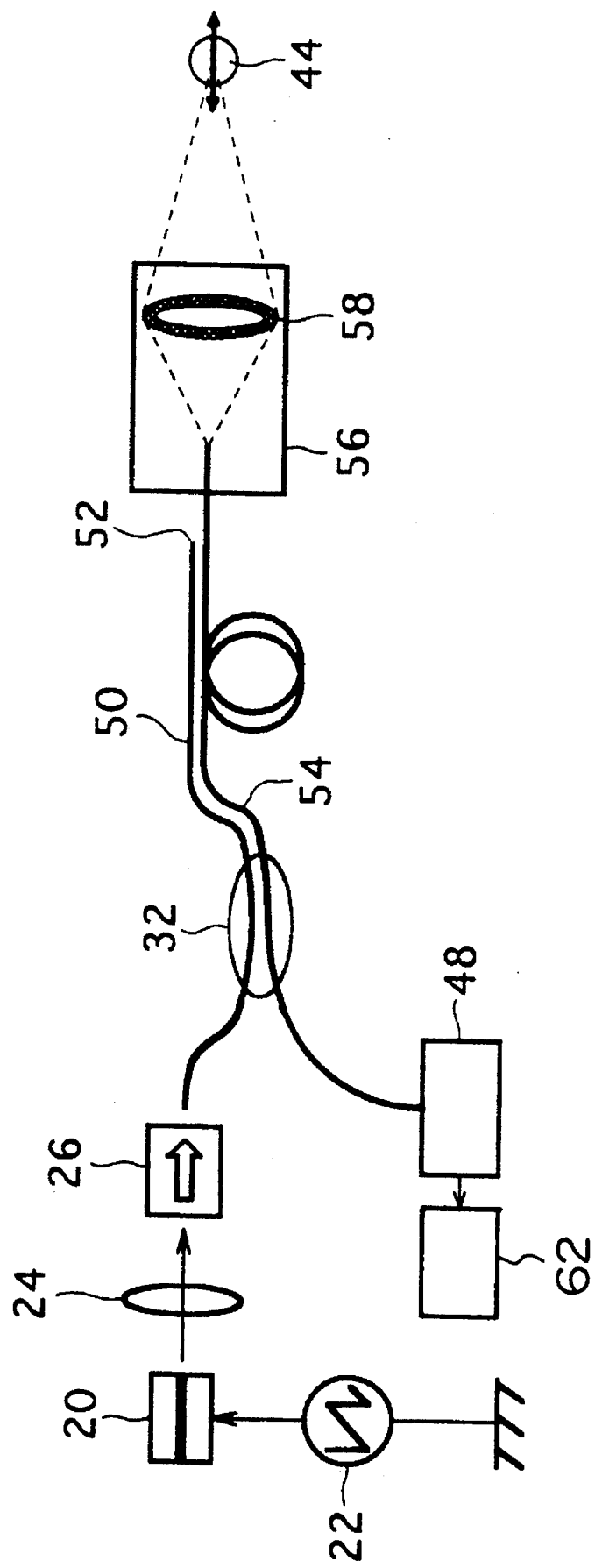
FIG. 7 is a schematic diagram of a reference-beam type laser Doppler velocimeter in accordance with a second embodiment of the present invention.

FIG. 7 shows a configuration of the second embodiment in which the invention of this application is applied to the reference-beam type laser Doppler velocimeter. The reference-beam type laser Doppler velocimeter is capable of detecting velocity components of a particle which moves in the direction of the optical axis, and an azimuth is obtained if the velocity components are integrated, so that the laser Doppler velocimeter of this type is generally suitable as a vibration meter for measuring vibrations. In the reference-beam type laser Doppler velocimeter, the laser light transmitted from the light source via the optical isolator 26 is branched into two beams by the optical-fiber directional coupler 32, and one beam of laser light is led to a reference optical fiber 50 which does not undergo a Doppler shift, While the other beam of laser light is transmitted to a measuring probe 56 by an optical fiber 54 for projection and reception which consists of one optical fiber used for both the projection and reception of light. Since the end face of the reference optical fiber 50 is coated with a reflecting film 52 so as to totally reflect the laser light, the laser light made incident from the optical-fiber directional coupler 32 side is reflected by the reflecting film 52, and is turned back. Incidentally, the laser light may be turned back by means of a mirror or the like instead of coating the reflecting film. An optical path difference L is imparted between the reference optical fiber 50 and the optical fiber 54 for projection and reception in the same way as described above.

The measuring probe 56 has a focusing lens 58, and the end portion of the optical fiber 54 for projection and reception is inserted in the measuring probe 56 so that the end face of the optical fiber 54 for projection and reception is located at the focusing position of the focusing lens 58. Accordingly, the laser light made emitted from the end face of the optical fiber 54 for projection and reception is focused in the focused portion 44 by means of the focusing lens 58. The scattered light from a particle which moves in the left-and-right direction, as shown by the double-headed arrow in the drawing, is passed through the focusing lens 58 again, and is transmitted to the photodetector 48 by the optical fiber 54 for projection and reception. As can be appreciated from FIG. 7, the direction in which the flow velocity is measured in the reference-beam type laser Doppler velocimeter differs 90° from the differential-type laser Doppler velocimeter. Then, the scattered light from the particle and the reference beam which has not undergone a Doppler shift are subjected to heterodyne detection at the photoelectric conversion surface of the photodetector 48. The frequency $f_S$ of the signal of the received light from the scattering particle, which is obtained at this time, is given by the following formula:

$$f_S = f_{OF} + f_{DD} \tag{8}$$

$$f_{DD} = (2v/\lambda) \cdot \cos\theta \tag{9}$$

where $f_{OF}$ is the offset frequency which is determined by the optical path difference L of the optical fibers and the rate of change over time of the oscillation frequency of the semiconductor laser, which is a modulation characteristic of the semiconductor laser; $f_{DD}$ is the Doppler shift frequency due to the scattering particle; v is the flow velocity of the scattering particle; λ is the wavelength of the light from the light source; and θ is an angle formed by the optical axis and the direction of the flow velocity v of the scattering particle. Namely, since the frequency of the signal of the received light is detected with the amount of frequency shift, $f_{OF}$, at the light source set as the offset frequency in the same way as described above, if this offset frequency is determined in advance, it is possible to detect only the Doppler shift frequency $f_{DD}$. Thus it is possible to determine the flow velocity and the direction of the flow velocity from the detected Doppler shift frequency $f_{DD}$.

Next, referring to FIG. 8, a description will be given of a third embodiment in which the present invention is applied to a differential-type laser Doppler velocimeter for measuring a multiplicity of points. Incidentally, in FIG. 8, those portions that are identical to those of FIG. 3 will be denoted by the same reference numerals, and a description thereof will be omitted.

In this embodiment, three one-input, two-output optical-fiber directional couplers 32₁, 32₂, and 32₃ for respectively branching the light emitted from the semiconductor laser 20 into two beams are provided. Accordingly, the respective beams obtained by branching the light into two beams by the optical-fiber directional coupler 32₁ are further branched into two beams, respectively, by the optical-fiber directional couplers 32₂ and 32₃, so that a total of four branched beams are obtained. Incidentally, beam splitters or the like may be used instead of the optical-fiber directional couplers.

The optical-fiber directional couplers 32₂ and 32₃ are optically coupled to a first measuring probe 42₁ via a first optical fiber pair 60₁ consisting of the first projecting optical fiber 28 and the second projecting optical fiber 30, and are also optically coupled to a second measuring probe 42₂ via a second optical fiber pair 60₂ consisting of the first projecting optical fiber 28 and the second projecting optical fiber 30. An optical path difference $L_1$ is provided between the first projecting optical fiber 28 and the second projecting optical fiber 30 of the first optical fiber pair 60₁, while an optical path difference $L_2$ ($\neq L_1$) is provided between the first projecting optical fiber 28 and the second projecting optical fiber 30 of the second optical fiber pair 60₂. Incidentally, each measuring probe is configured in the same way as shown in FIG. 4.

Figure 8:
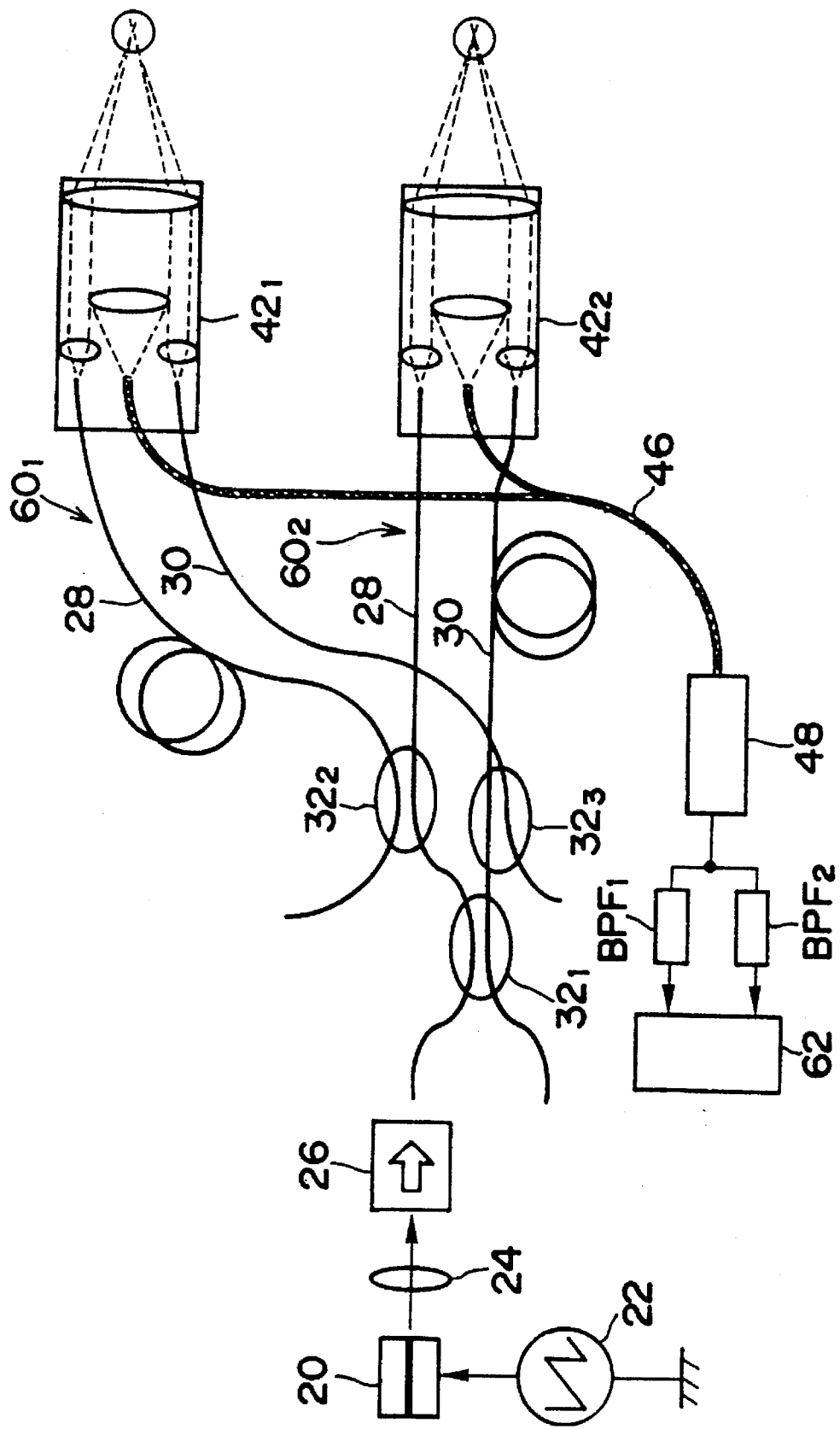
FIG. 8 is a schematic diagram of a differential-type laser Doppler velocimeter for simultaneously measuring two measurement points in accordance with a third embodiment of the present invention.

Although, in FIG. 8, an example has been shown in which each of the optical-fiber directional couplers 32₂ and 32₃ is coupled to both of the first and second measuring probes 42₁ and 42₂, the optical-fiber directional coupler 32₂ may be optically coupled to only the first measuring probe 42₁, and the optical-fiber directional coupler 32₃ may be optically coupled to only the second measuring probe 42₂.

In addition, the first and second measuring probes 42₁ and 42₂ are optically coupled to the photodetector 48 via the light-receiving optical fibers 46 for transmitting the scattered light made incident upon the first and second measuring probes 42₁ and 42₂. The light-receiving optical fibers 46 may be arranged such that two fibers are bundled and their ends are located at the light-receiving surface of the photodetector 48, or the light beams transmitted through the light-receiving optical fibers 46 are synthesized into one output by a two-input, one-output optical-fiber directional coupler, and are received at the light-receiving surface of the photodetector 48. The calculating circuit 62 is connected to the photodetector 48 via bandpass filters BPF₁ and BPF₂.

In this embodiment, in the same way as the above-described first embodiment, the frequency differences between two laser light components in the respective optical fiber pairs, i.e., offset frequencies $f_{OF1}$ and $f_{OF2}$, are given by the following formulae:

$$f_{OF1} = (dv/dt) \cdot (L_1/c) \tag{10}$$

$$f_{OF2} = (dv/dt) \cdot (L_2/c) \tag{11}$$

In addition, if the respective Doppler shift frequencies are set to be $f_{D1}$ and $f_{D2}$, the frequencies $f_{S1}$ and $f_{S2}$ of the signals of the received light are given by the following formulae:

$$f_{S1} = f_{OF1} + f_{D1} \tag{12}$$

$$f_{S2}=f_{OF2}+f_{D2} \quad (13)$$

Figure 9:
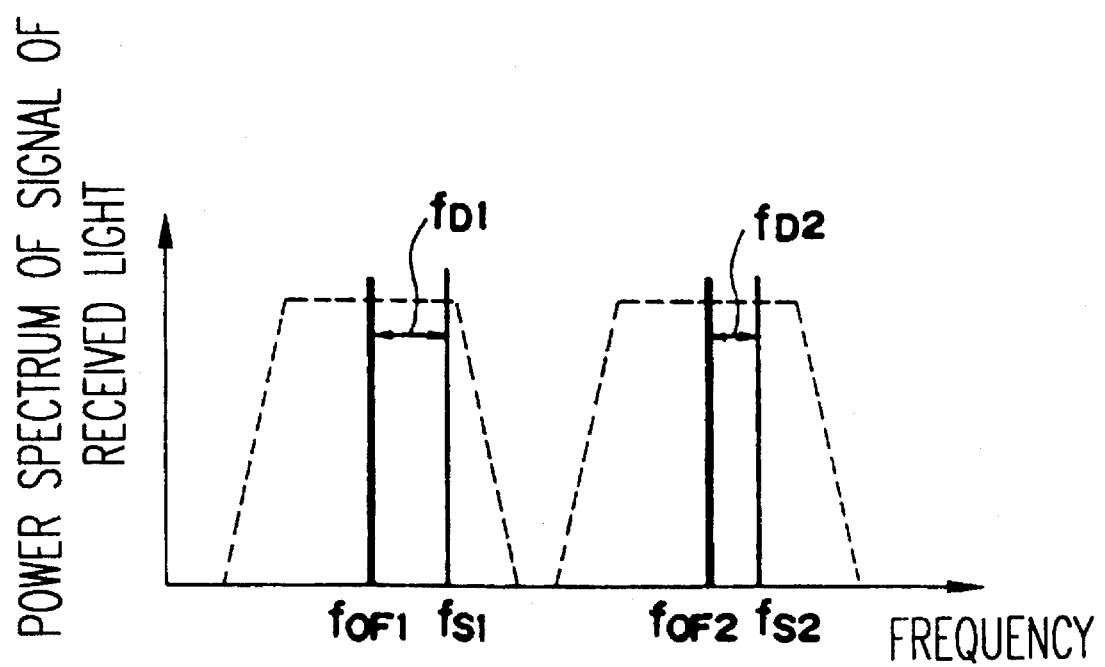
FIG. 9 is a diagram illustrating the relationship between the frequency and a power spectrum of a signal of received light in the differential-type laser Doppler velocimeter shown in FIG. 8.

Since these offset frequencies $f_{OF1}$ and $f_{OF2}$ assume mutually different values, the signals of the received light at the frequencies $f_{S1}$ and $f_{S2}$ can be separated from each other in terms of the frequency region, as shown in FIG. 9. In other words, the signals of the received light can be separated and detected by arranging the passbands of the bandpass filters $BPF_1$ and $BPF_2$ such that the offset frequencies $f_{OF1}$ and $f_{OF2}$ are respectively set as central frequencies, and Doppler frequency ranges (which can be calculated in accordance with Formula (2) above) corresponding to ranges of flow-velocity measurement by the velocimeter are set as passbands. In addition, the offset frequencies $f_{OF1}$ and $f_{OF2}$ need not necessarily be set as central frequencies, but may be set within the passbands of the corresponding bandpass filters.

Then, the flow velocity and the direction of the flow velocity can be detected from the detected Doppler shift frequencies $f_{Di}$ (i denotes a number allotted to the respective measurement point in order) in accordance with the following formula:

$$f_{Di}=(2v_i/\lambda)\sin(\phi_i/2) \quad (14)$$

It should be noted that since the offset frequencies $f_{OF1}$ and $f_{OF2}$ are determined by the optical path differences $L_1$ and $L_2$, if the optical path differences $L_1$ and $L_2$ are set to appropriate values, the signals of the received light can be separated with high accuracy such that the passbands of the bandpass filters $BPF_1$ and $BPF_2$ do not overlap.

Here, in each measuring probe, since only the optical path difference in the projecting optical fibers is a parameter for frequency separation, there is particularly no restriction on the absolute lengths of the optical fibers.

Figure 10:
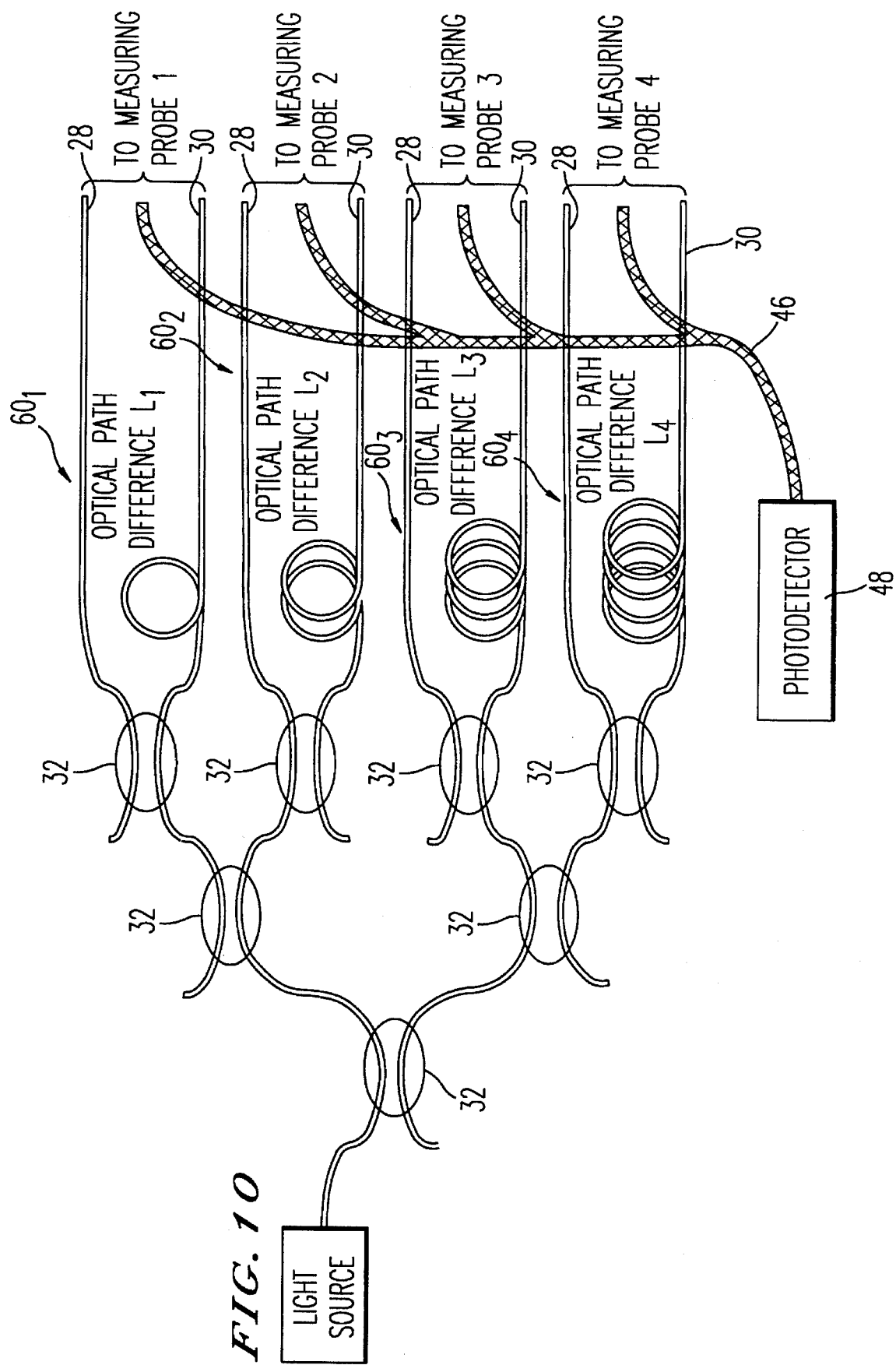
FIG. 10 is a schematic diagram illustrating an essential portion of a differential-type laser Doppler velocimeter for simultaneously measuring four measurement points.

FIG. 10 shows an example in which four measurement points are measured simultaneously. It should be noted that, in the example which is described below, the semiconductor laser 20, the driving circuit 22, the collimator lens 24, and the optical isolator 26 are simply described as the light source. In this example, the one-input, two-output optical-fiber directional couplers 32 are arranged in series in three stages respectively comprising one coupler, two couplers, and four couplers in that order, so that the laser light outputted from one light source is branched into eight beams of laser light, which are transmitted to respective measuring probes via optical fiber pairs $60_1$ to $60_4$. Mutually different optical path differences $L_1$, $L_2$, $L_3$, and $L_4$ are provided for the respective sets of the first projecting optical fiber 28 and the second projecting optical fiber 30 that constitute the optical fiber pairs $60_1$ to $60_4$.

Figure 13:
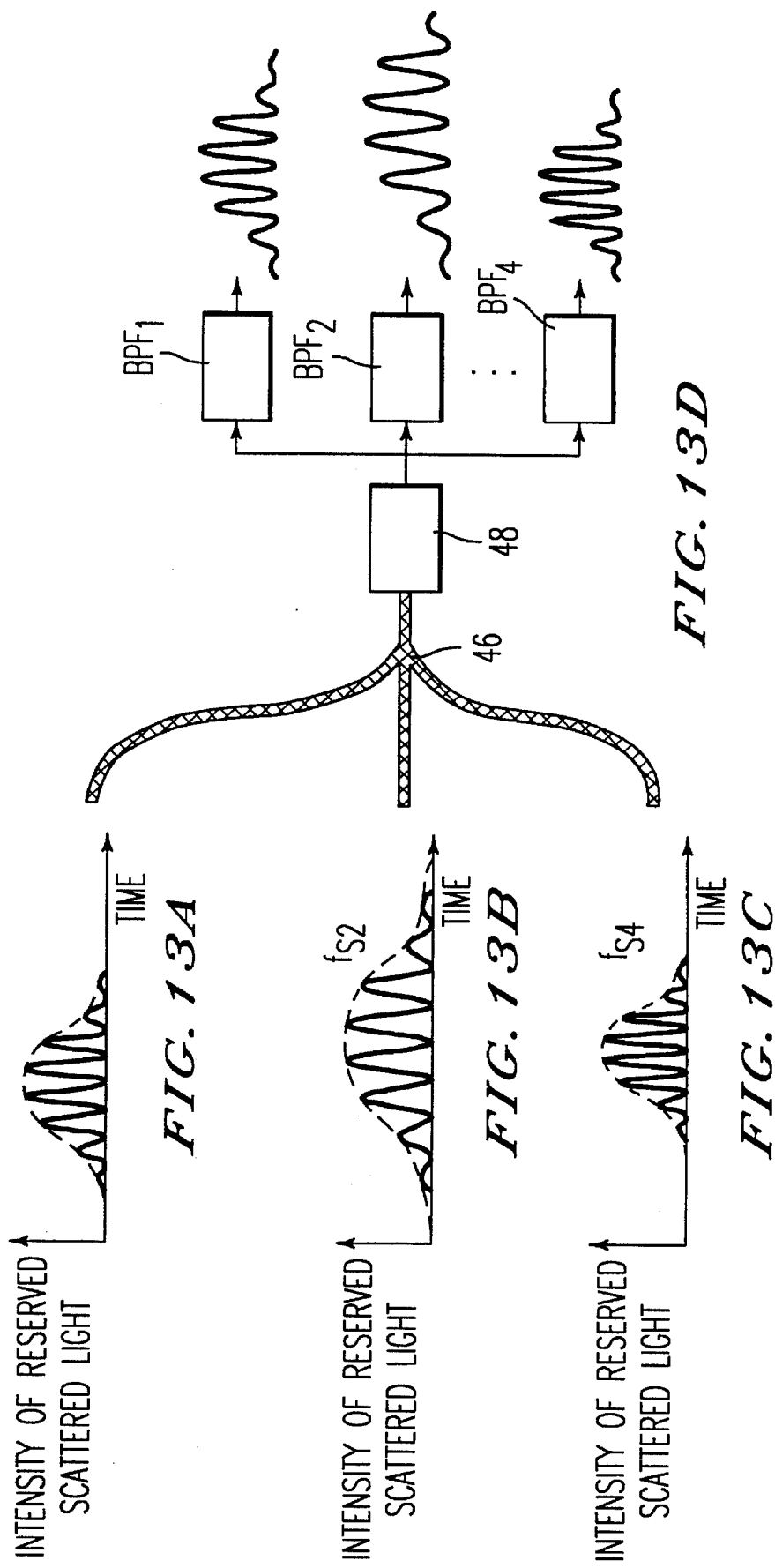
FIG. 13 is a block diagram illustrating a state of connection of bandpass filters in accordance with a fourth embodiment of the present invention.

The scattered light made incident upon the respective measuring probes is made incident upon the photodetector 48 via the light-receiving optical fibers 46. Bandpass filters $BPF_1$, $BPF_2$, $BPF_3$, and $BPF_4$ having offset frequencies $f_{OF1}$, $f_{OF2}$, $f_{OF3}$, and $f_{OF4}$ as central frequencies of their passbands are connected to the photodetector 48, as shown in FIG. 13. Since the intensity of each signal of the received light has been modulated, if the signals of the received light are subjected to photoelectric conversion by the photodetector 48 and are allowed to pass through the bandpass filters, it is possible to obtain electrical signals at frequencies corresponding to the respective measurement points. From these electrical signals, it is possible to simultaneously determine the flow velocities and the directions of the flow velocities at the four measurement points.

Figure 11:
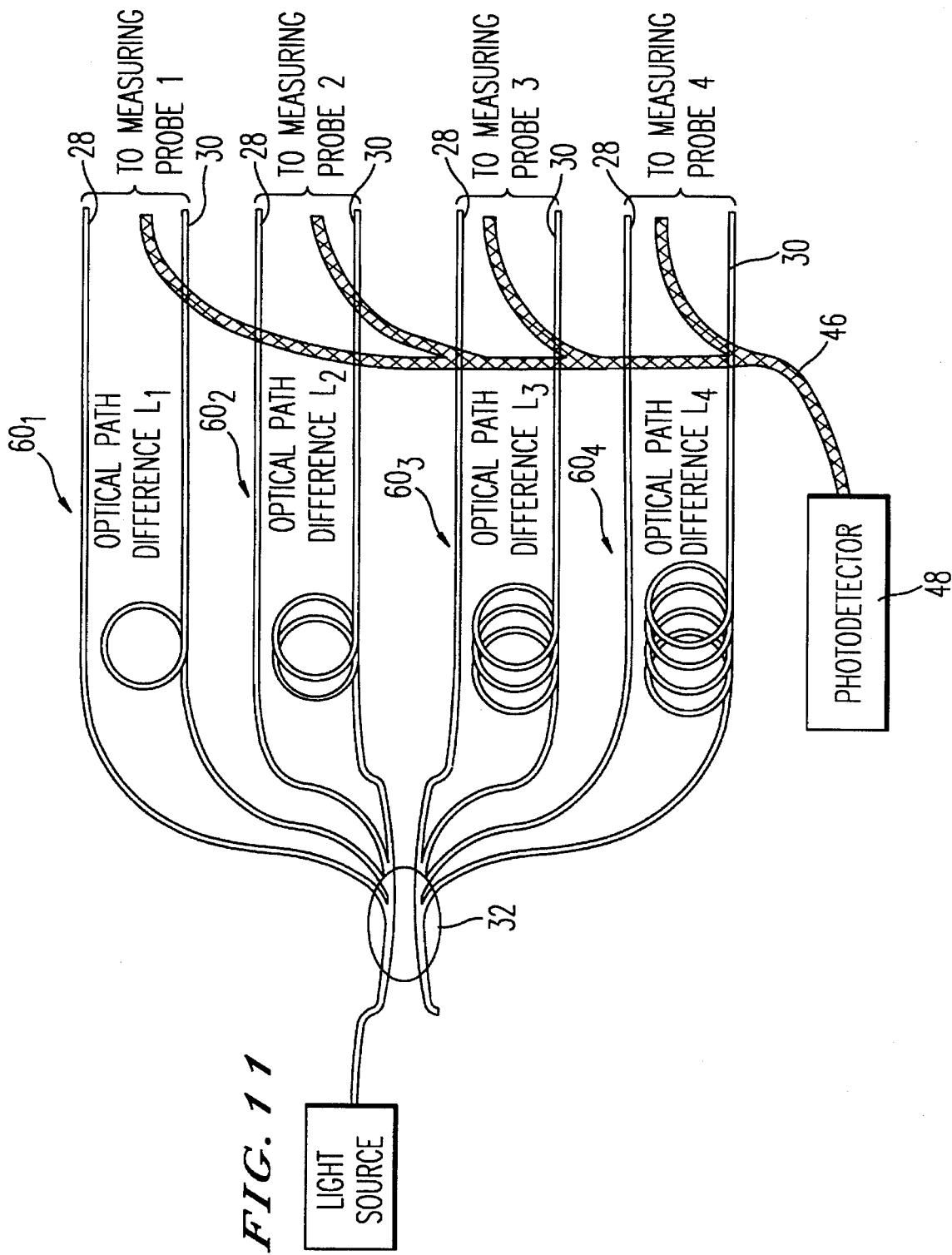
FIG. 11 is a schematic diagram illustrating another example of the essential portion of the differential-type laser Doppler velocimeter for simultaneously measuring four measurement points.

It is possible to branch the laser light by using a single one-input, eight-output optical-fiber directional coupler 32, as shown in FIG. 11.

In the example of FIG. 10, only the laser light outputted from the optical-fiber directional couplers in the final stage is transmitted to the measuring probes, and, in the example of FIG. 11, only the laser light outputted from the single optical-fiber directional coupler is transmitted to the measuring probes. Hence, in these examples, laser light having equal quantities of light is transmitted to the measuring probes, so that Doppler signals of the highest SN ratios are obtained.

Figure 12:
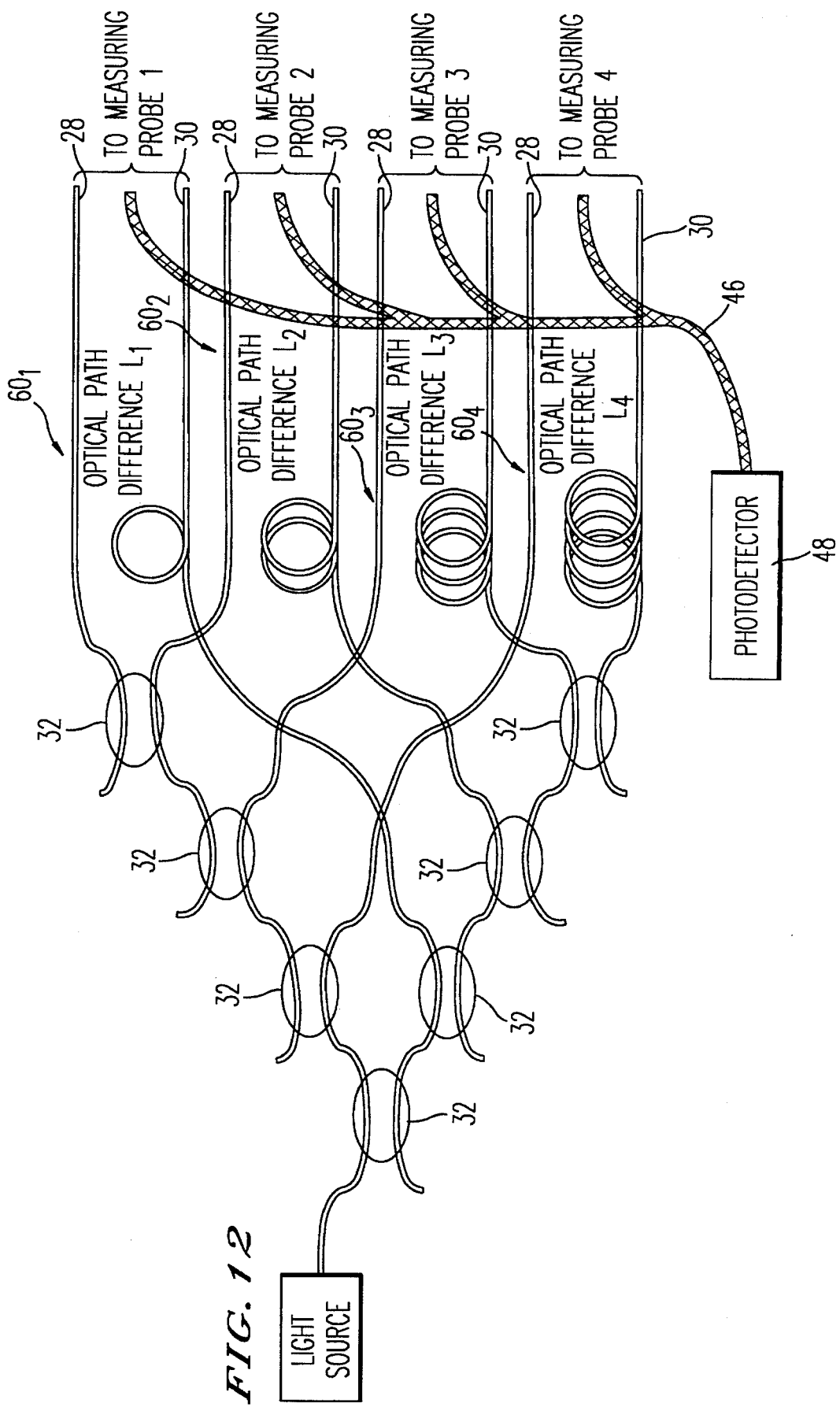
FIG. 12 is a schematic diagram illustrating still another example of the essential portion of the differential-type laser Doppler velocimeter for simultaneously measuring four measurement points.

Further, as shown in FIG. 12, an arrangement may be alternatively provided such that the one-input, two-output optical-fiber directional couplers 32 are arranged in series in four stages respectively comprising one coupler, two couplers, two couplers, and two couplers in that order, so that laser light outputted from one light source is branched into eight beams of laser light. In the example of FIG. 12, unlike the examples of FIGS. 10 and 11, in addition to the laser light outputted from the optical-fiber directional couplers in the final stage, the laser light outputted from the optical-fiber directional couplers in the intermediate stages is also transmitted to the measuring probes. Hence, the quantities of laser light transmitted to the measuring probes are not equal, but the SN ratio only declines slightly, and the measurement is possible by means of such a branching arrangement.

In the above-described embodiment of the differential-type laser Doppler velocimeter, a description has been given of cases where two measurement points and four measurement points are measured, but, in the present invention, two or more measurement points can be measured by providing two or more measuring probes and setting the optical path differences of the optical fiber pairs, which are optically coupled to the measuring probes, to mutually different values.

Namely, in the above-described differential-type laser Doppler velocimeter for measuring a multiplicity of points, the laser light emitted from the light source is branched into 2N (N is a natural number) beams of laser light, and the branched beams of laser light are transmitted to the respective N measuring probes by means of N sets of optical fiber pairs respectively having optical path differences of $L_1$, $L_2$, ..., $L_N$ ($L_1 \neq L_2 ... \neq L_N$). The scattered light from N measurement points is then detected by a single photodetector, and the signals of the received light are detected by being separated by N bandpass filters in which the offset frequencies $f_{OFi}$ are set as central frequencies, and passbands are mutually different.

Figure 14:
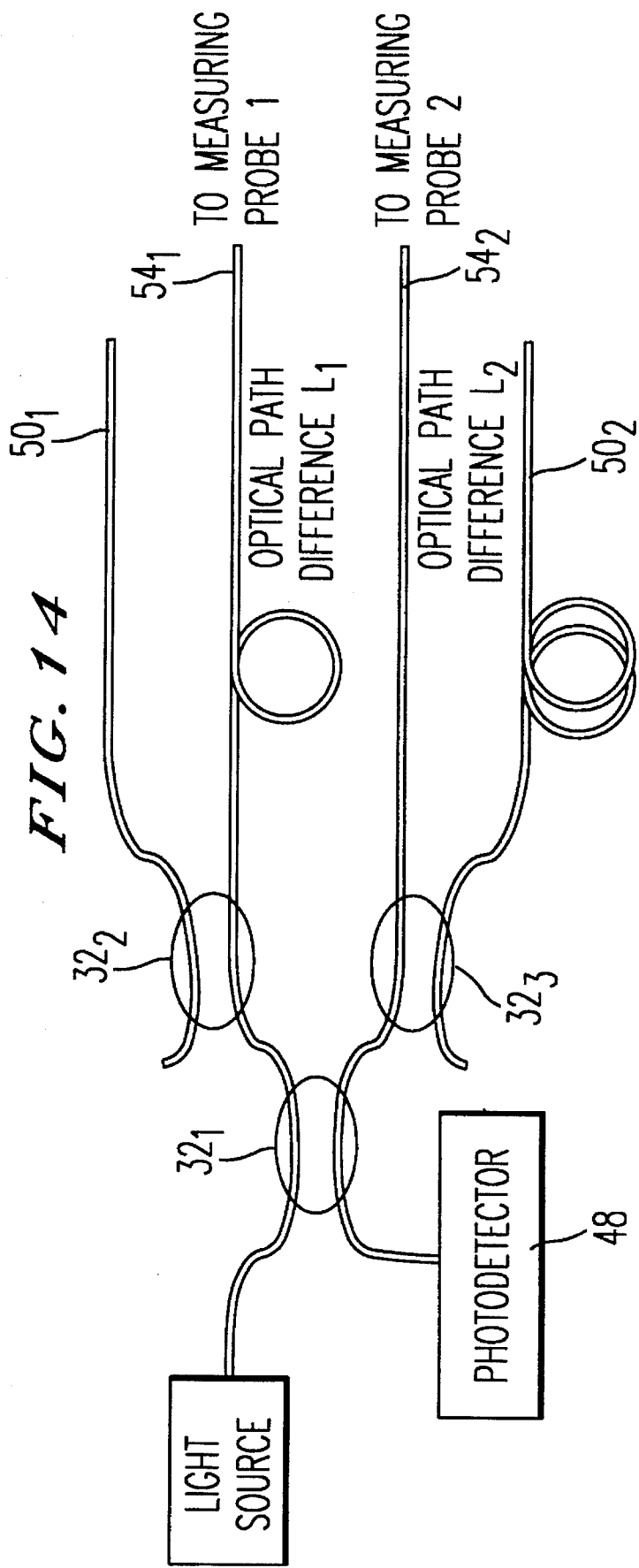
FIG. 14 is a schematic diagram of a reference-beam type laser Doppler velocimeter for simultaneously measuring two measurement points in accordance with the fourth embodiment of the present invention.

Next, referring to FIG. 14, a description will be given of a fourth embodiment in which the present invention is applied to a reference-beam type laser Doppler velocimeter for measuring a multiplicity of points. Incidentally, in FIG. 14, a description will be given by denoting those portions that are identical to those of FIG. 3 by the same reference numerals.

In this embodiment, three one-input, two-output optical-fiber directional couplers $32_1$, $32_2$, and $32_3$ for branching the light emitted from the light source into two beams are provided. Accordingly, a total of four branched beams are obtained by the three optical-fiber directional couplers. Incidentally, beam splitters or the like may be used instead of the optical-fiber directional couplers.

One beam of the laser light branched by the optical-fiber directional coupler $32_2$ is led to a reference optical fiber $50_1$ which has an end face coated with a reflecting film so as to totally reflect the laser light and which is not subjected to a Doppler shift. Meanwhile, the other beam of laser light is transmitted to the first measuring probe by means of an optical fiber $54_1$ for projection and reception consisting of a single optical fiber and used for both projection and reception of light. In addition, one laser beam branched by the optical-fiber directional coupler $32_3$ is led to a reference optical fiber $50_2$ which has an end face coated with a reflecting film so as to totally reflect the laser beam and which is not subjected to a Doppler shift. Meanwhile, the other laser beam is transmitted to the second measuring probe by means of an optical fiber $54_2$ for projection and reception consisting of a single optical fiber and used for both projection and reception of light. An optical path difference $L_1$ is provided between the reference optical fiber $50_1$ and the optical fiber $54_1$ for projection and reception, and an optical path difference $L_2$ is provided between the reference optical fiber $50_2$ and the optical fiber $54_2$ for projection and reception.

In this embodiment, frequency differences, i.e., the offset frequencies $f_{OF1}$ and $f_{OF2}$, of the two laser beams in the optical fibers for projection and reception are given by Formulae (10) and (11) above in the same way as in the above embodiments.

Thus, since the Doppler shift appears with $f_{OF1}$ and $f_{OF2}$ set as the offset frequencies, it is possible to measure only the Doppler shift frequencies $f_{D1}$ and $f_{D2}$ with high accuracy by using the bandpass filters. Therefore, it is possible to determine the velocity of the scattering particle, i.e., the flow velocity and the direction of the flow velocity, in accordance with the following Formula:

$$f_{DDi} = (2v_i/\lambda) \cdot \cos\theta_i \quad (15)$$

Figure 15:
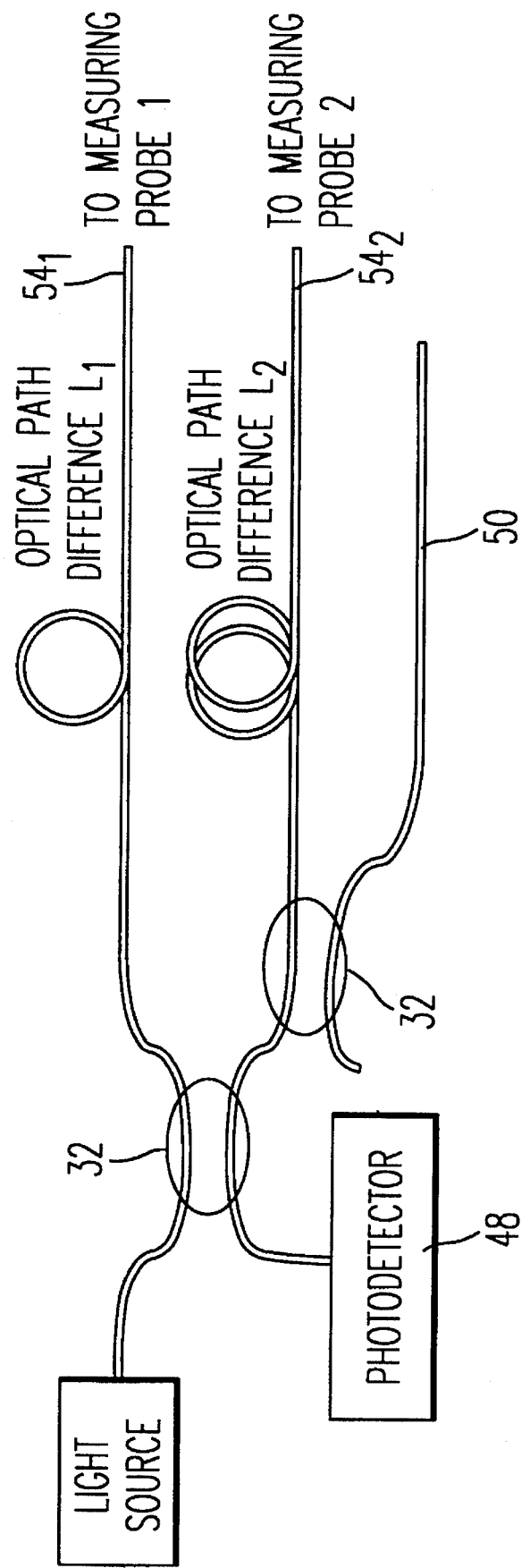
FIG. 15 is a schematic diagram illustrating another example of the essential portion of the reference-beam type laser Doppler velocimeter for simultaneously measuring two measurement points.

FIG. 15 shows an example in which a single reference optical fiber 50 is used as the reference optical fiber, and is used jointly by the optical fiber $54_1$ for projection and reception and the optical fiber $54_2$ for projection and reception. The optical fiber $54_1$ for projection and reception and the optical fiber $54_2$ for projection and reception are given the optical path differences $L_1$ and $L_2$, respectively, with respect to the reference optical fiber 50.

Figure 16:
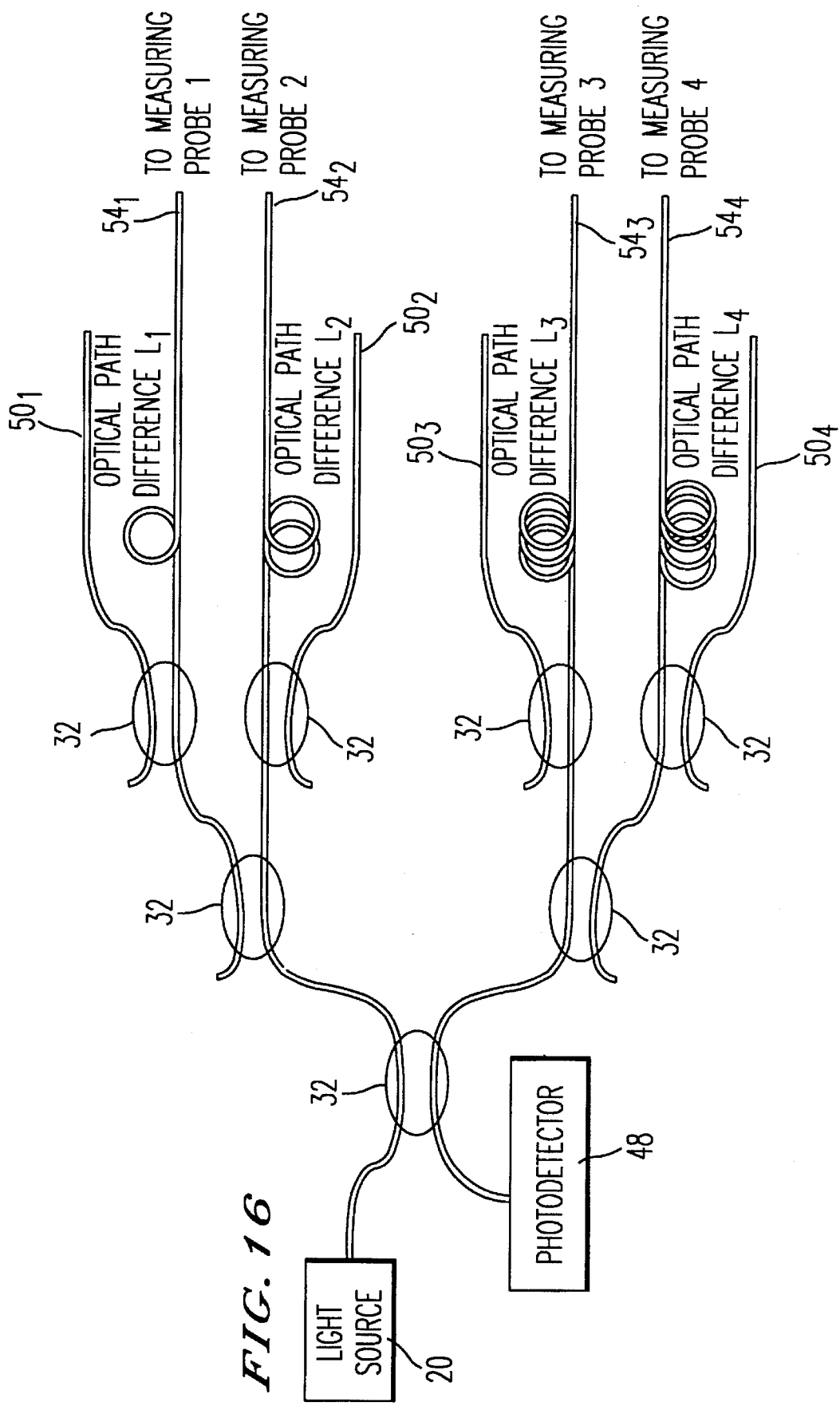
FIG. 16 is a schematic diagram illustrating an essential portion of the reference-beam type laser Doppler velocimeter for simultaneously measuring four measurement points.
Figure 17:
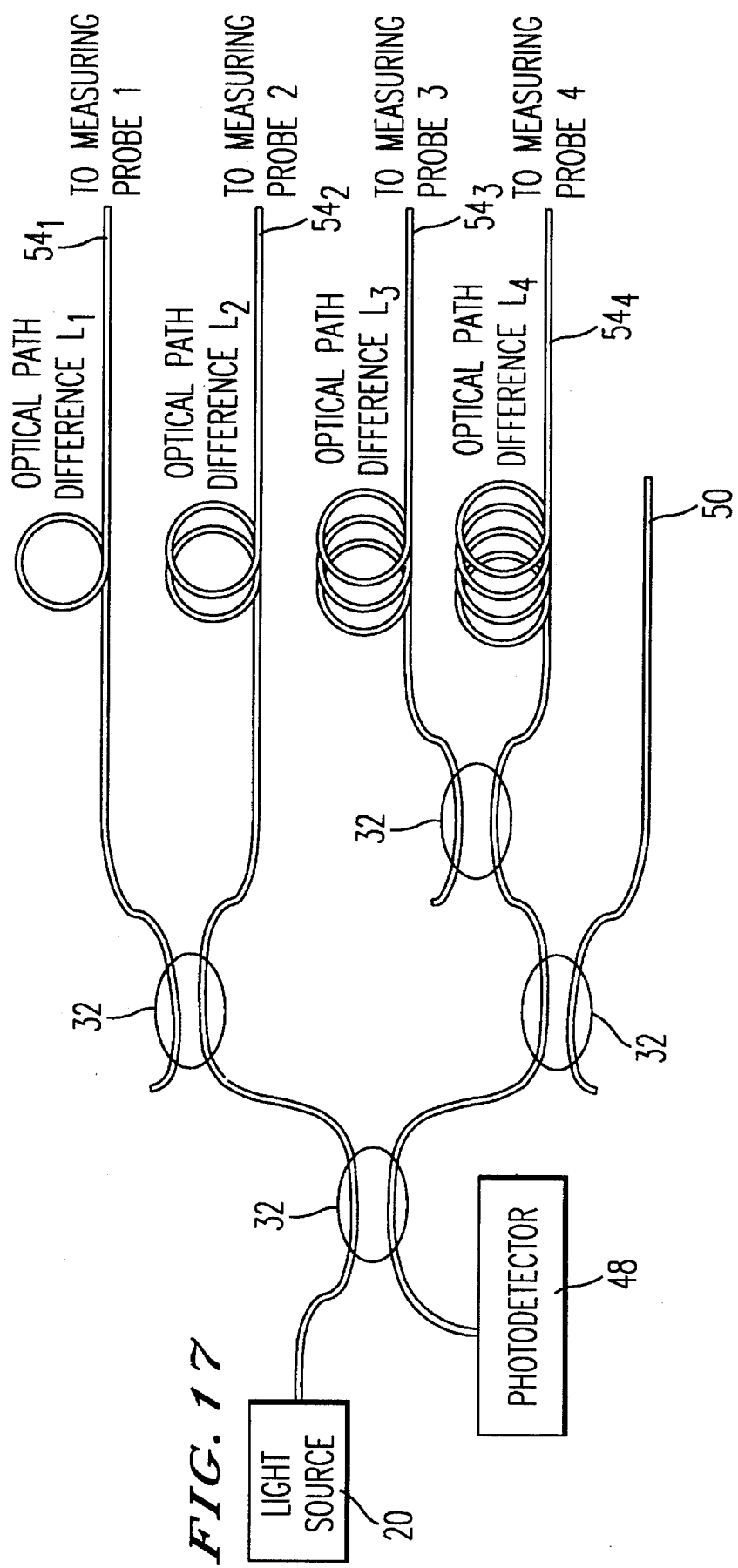
FIG. 17 is a schematic diagram illustrating another example of the essential portion of the reference-beam type laser Doppler velocimeter for simultaneously measuring four measurement points.

FIGS. 16 and 17 illustrate an example in which four measurement points are measured simultaneously. In the example shown in FIG. 16, the one-input, two-output optical-fiber directional couplers 32 are arranged in series in three stages respectively comprising one coupler, two couplers, and four couplers in that order, so that the laser light outputted from one light source is branched into eight beams of laser light, which are transmitted to respective measuring probes via the optical fibers $54_1$ to $54_4$ for projection and reception. In addition, four reference optical fibers $50_1$ to $50_4$ are used. In this example, the offset frequencies are conceivably generated by the optical path differences among the reference optical fibers. In this respect, however, the offset frequencies can be separated by bandpass filters if the optical path differences among the reference optical fibers are set sufficiently greater than the optical path differences among the optical fibers for projection and reception, or if the optical path differences among the reference optical fibers are set to an identical value (at this time, the outputs become d.c. components).

In FIG. 17, an example is shown in which four measurement points are measured simultaneously by using a single reference optical fiber 50 which is used jointly by the respective optical fibers $54_1$ to $54_4$ for projection and reception.

It should be noted that, in both cases, mutually different optical path differences $L_1$, $L_2$, $L_3$, and $L_4$ are provided between the optical fibers $54_1$ to $54_4$ for projection and reception and the respective reference optical fibers $50_1$ to $50_4$ (the example of FIG. 16), and between the optical fibers $54_1$ to $54_4$ for projection and reception and the optical fiber 50 (the example of FIG. 17).

Incidentally, although in the above a description has been given of examples in which one reference optical fiber is provided or reference optical fibers are provided in a number identical to the number of measuring probes, it is possible to provide an arbitrary number of reference optical fibers if the number falls within one to the number of the measuring probes.

In the above-described embodiment of the reference-beam type laser Doppler velocimeter, a description has been given of cases where two and four measurement points are measured. In the present invention, however, if two or more measuring probes are provided, and the optical path differences of the optical fiber pairs which are optically coupled to respective measuring probes are set to mutually different values, it is possible to simultaneously measure two or more measurement points.

That is, in the above-described reference-beam type laser Doppler velocimeter for measuring a multiplicity of points, it suffices if the laser light emitted from the light source is branched into 2N beams of laser light, and the branched beams of laser light are transmitted to the respective N measuring probes by means of N optical fibers for projection and reception respectively having optical path differences of $L_1, L_2, \ldots, L_N$ ($L_1 \neq L_2 \ldots \neq L_N$), and if the scattered light from N measurement points and the reference beam(s) are then detected by a single photodetector by using 1 to N reference optical fibers, and the signals of the received light are detected by being separated by N bandpass filters in which the offset frequencies $f_{OFi}$ are set as central frequencies, and passbands are mutually different.

In the above-described second to fourth embodiments as well, the optical fibers are preferably disposed as close to each other as possible so as to reduce the effect of the ambient temperature, in the same way as in the first embodiment.

Although in the foregoing embodiments a description has been given of the case where the electric current injected into the semiconductor laser is modulated into sawtooth waveform to generate offset frequencies, the modulation is not confined to sawtooth waveform, and may be effected in triangular waveform.

Figure 18:
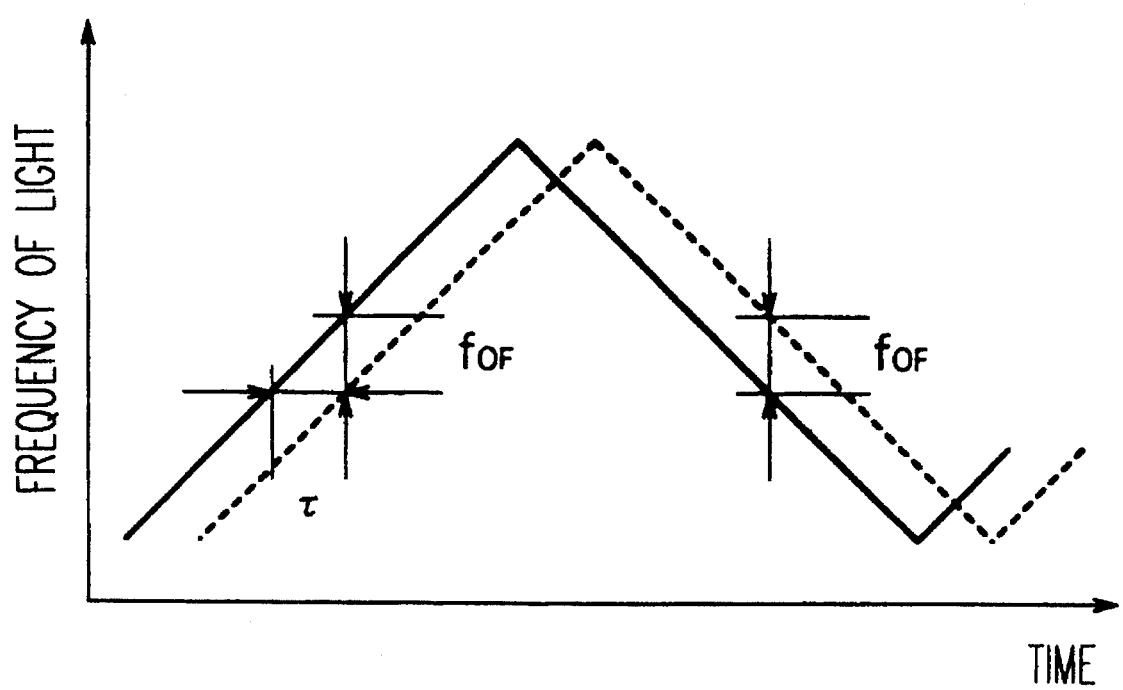
FIG. 18 is a diagram illustrating the relationship between the frequency and time in a case where the modulated waves are formed as triangular waves.

If the sawtooth waveform is adopted as the modulated waveform, the frequency of the projected light beam A in the focused portion is constantly $f_{OF}$ higher than the frequency of the projected light beam B, as shown in FIG. 5A, so that it is possible to obtain the offset frequency shown in Formula (5) without being dependent on time. Meanwhile, in the modulation into the triangular waveform, as shown in FIG. 18, since the frequency of the projected light beam A is inverted with respect to the frequency of the projected light beam B in a half period of modulation, the result of detection of the direction of the flow velocity is inverted in each half period. However, if the modulation condition is monitored, it is possible to accurately detect the direction of the flow velocity.

In addition, if the oscillation frequency changes continuously, it is possible to effect modulation not only in the above-described two kinds of modulation waveform but also in another waveform. If modulation is effected in another waveform (e.g., a sinusoidal waveform), the offset frequency does not produce a fixed waveform in terms of time, so that a separate measuring system is required for detecting the time the scattering particle has passed through the light focused portion 44.

In addition, although in the above a semiconductor laser is used as the light source, if the oscillation frequency can be changed continuously, a sold-state laser such as a YAG laser may also be used, and a semiconductor laser of multi-mode longitudinal oscillation may also be used for single-mode longitudinal oscillation by the use of an external resonator or the like. To allow the semiconductor laser of multi-mode longitudinal oscillation to oscillate in a single longitudinal mode, it suffices if a mirror or a diffraction grating is disposed on the laser light-emitting side, and the laser light being oscillated is directly returned to the semiconductor laser in such a manner as to satisfy a certain phase condition.

Also, it is possible to allow the light source to oscillate at a fixed frequency and use an external modulation element (a frequency shifter, a phase modulation element such as an optical modulation element of an optical integrated type using $LiNbO_3$, or the like).

As described above, in accordance with the above-described embodiments, since the frequency of the light source is modulated, and optical path differences are imparted to the optical fibers, it is possible to set the offset frequency to an arbitrary value, and it is possible to measure with high accuracy an object whose flow velocity is to be measured extensively. Additionally, the use of optical fibers to obtain optical path differences provides a structure wherein temperature fluctuations in the optical path differences can be canceled. Hence, it is possible to obtain stable offset frequencies, thereby making it possible to measure the flow velocity and the direction of the flow velocity with high accuracy. Since an exclusive-use optical system can be configured for receiving the scattered light from the particles passing through the focused portion by the measuring probes, it is possible to obtain signals of a high signal-to-noise ratio.

What is claimed is:

1. A laser Doppler velocimeter comprising:
    a light source for emitting laser light whose frequency changes continuously for at least a fixed time duration;
    a branching device for branching the laser light emitted from said light source into at least two beams;
    at least one pair of optical fibers for transmitting each of the laser beams branched by said branching device, said optical fibers having an optical path difference therebetween;
    at least one focusing device for focusing the laser beams transmitted by said optical fibers onto a region to be measured;
    at least one incident device upon which is projected scattered light from the region to be measured where the laser beams are focused;
    a light-receiving device for receiving the scattered light from said incident device; and
    a calculating device for calculating at least one Doppler shift frequency in the region to be measured on the basis of a frequency of a signal of the scattered light received by said light-receiving device, said optical path difference, and a rate of change of the frequency of the laser light.

2. A laser Doppler velocimeter according to claim 1, wherein said branching device branches the laser light into 2N beams, N pairs of optical fibers having mutually different optical path differences are provided as said at least one pair of optical fibers, N focusing devices and N incident devices are provided as said at least one focusing device and said at least one incident device, respectively, and said calculating device calculates N Doppler shift frequencies, wherein N is a natural number.

3. A laser Doppler velocimeter according to claim 2, wherein said calculating device includes: N bandpass filters with predetermined passbands to which signals of the received scattered light are respectively inputted, each of said predetermined passbands having a frequency determined on the basis of one of the optical path differences and the rate of change of the frequency of the laser light; and a calculating circuit for calculating N Doppler shift frequencies on the basis of outputs from said bandpass filters.

4. A laser Doppler velocimeter according to claim 1, wherein said at least one pair of optical fibers are disposed in close proximity to each other so as to cancel an effect due to temperature fluctuations.

5. A laser Doppler velocimeter according to claim 1, wherein the optical path difference of said optical fibers is set to be shorter than a coherence length of the laser light.

6. A laser Doppler velocimeter comprising:
    a light source for emitting laser light whose frequency changes continuously for at least a fixed time duration;
    at least one branching device for branching the laser light emitted from said light source into at least two beams;
    at least one reference optical fiber for transmitting one of the laser beams branched by said branching device as a reference beam;
    at least one measurement optical fiber for transmitting another of the laser beams branched by said branching device as a measuring beam, said at least one measurement optical fiber having an optical path difference with respect to said at least one reference optical fiber;
    at least one focusing device for focusing the laser beam transmitted by said measurement optical fiber onto a region to be measured;
    at least one incident device upon which is projected scattered light from the region to be measured where the laser beams are focused;
    a light-receiving device for receiving the scattered light from said incident device and the reference beam transmitted by said reference optical fiber; and
    a calculating device for calculating at least one Doppler shift frequency in the region to be measured on the basis of a frequency of a signal of the scattered light received by said light-receiving device, said optical path difference, and a rate of change of the frequency of the laser light.

7. A laser Doppler velocimeter according to claim 6, wherein said at least one branching device branches the laser light into N+1 to 2N beams, one to N reference optical fibers are provided as said at least one reference optical fiber, N measurement optical fibers having mutually different optical path differences are provided as said at least one measurement optical fiber, N focusing devices and N incident devices are provided as said at least one focusing device and said at least one incident device, respectively, and said calculating device calculates N Doppler shift frequencies, wherein N is a natural number.

8. A laser Doppler velocimeter according to claim 6, wherein said calculating device includes: N bandpass filters with predetermined passbands to which signals of the received scattered light are respectively inputted, each of said predetermined passbands having a frequency determined on the basis of one of the optical path differences and the rate of change of the frequency of the laser light; and a calculating circuit for calculating N Doppler shift frequencies on the basis of outputs from said bandpass filters.

9. A laser Doppler velocimeter according to claim 6, wherein said at least one reference optical fiber and said at least one measurement optical fiber are disposed in close proximity to each other so as to cancel an effect due to temperature fluctuations.

10. A laser Doppler velocimeter according to claim 6, wherein the optical path difference of said optical fibers is set to be shorter than a coherence length of the laser light.

* * * * *